US011062304B2

(12) United States Patent
Setchell et al.

(10) Patent No.: US 11,062,304 B2
(45) Date of Patent: Jul. 13, 2021

(54) OFFLINE USER IDENTIFICATION

(71) Applicant: Google LLC, Mountain View, CA (US)

(72) Inventors: William Setchell, Mendota, IL (US); Michal Palczewski, San Jose, CA (US); Yichen Zhao, Sunnyvale, CA (US); Thai Duong, Sunnyvale, CA (US); Thiago Valverde, San Jose, CA (US)

(73) Assignee: Google LLC, Mountain View, CA (US)

( * ) Notice: Subject to any disclaimer, the term of this patent is extended or adjusted under 35 U.S.C. 154(b) by 649 days.

(21) Appl. No.: 15/299,444

(22) Filed: Oct. 20, 2016

(65) Prior Publication Data
US 2018/0114219 A1 Apr. 26, 2018

(51) Int. Cl.
*G06Q 20/38* (2012.01)
*H04L 9/32* (2006.01)
(Continued)

(52) U.S. Cl.
CPC ......... *G06Q 20/3829* (2013.01); *G06F 21/31* (2013.01); *G06Q 20/3278* (2013.01);
(Continued)

(58) Field of Classification Search
CPC ......... G06Q 20/202; G06Q 20/40145; G06Q 20/3278; G06Q 20/3829; G06Q 20/405;
(Continued)

(56) References Cited

U.S. PATENT DOCUMENTS 5,768,379 A  6/1998 Girault et al.
6,522,772 B1 2/2003 Morrison et al.
(Continued)

FOREIGN PATENT DOCUMENTS

AU  2017101062 A4  8/2017
EP  2 963 615 A1   1/2016
(Continued)

OTHER PUBLICATIONS

McCoy "U.S. Office Action issued in copending U.S. Appl. No. 15/143,453, filed Apr. 29, 2016", dated Oct. 29, 2018, 18 pages.
(Continued)

*Primary Examiner* — James D Nigh
*Assistant Examiner* — Yin Y Choi
(74) *Attorney, Agent, or Firm* — Dority & Manning, P.A.

(57) ABSTRACT

A service provider system registers with a service system. A user establishes an account with the service system and the service system establishes a facial template associated with the user account. The service system transmits, to a service provider device at a location, identification information and transmits a shared encryption key to a user computing device associated with the user. The user enters the merchant location carrying the user computing device. The service device receives the encryption key from the user device and decrypts the identification information associated with the user using the encryption key. The user initiates a service request and the service provider device verifies the identity of the user via the facial template associated with the user by generating a facial template based on an image captured of the user to compare against the facial template associated with the user. The service device processes the service request.

16 Claims, 10 Drawing Sheets

(51) Int. Cl.
  *H04L 9/08* (2006.01)
  *H04L 29/06* (2006.01)
  *G06Q 20/40* (2012.01)
  *G06Q 20/32* (2012.01)
  *G06F 21/31* (2013.01)

(52) U.S. Cl.
  CPC ..... *G06Q 20/405* (2013.01); *G06Q 20/40145* (2013.01); *H04L 9/0819* (2013.01); *H04L 9/0894* (2013.01); *H04L 9/3226* (2013.01); *H04L 9/3231* (2013.01); *H04L 63/102* (2013.01); *G06F 2221/2103* (2013.01); *H04L 2209/56* (2013.01)

(58) Field of Classification Search
  CPC ................ G06K 9/00255; G06F 21/31; G06F 2221/2103; H04L 9/3226; H04L 9/3231; H04L 9/0819; H04L 9/0894; H04L 63/102; H04L 2209/56
  USPC .......................................................... 705/71
  See application file for complete search history.

(56) References Cited

U.S. PATENT DOCUMENTS

| | | | |
|---|---|---|---|
| 8,254,647 | B1 | 8/2012 | Nechyba et al. |
| 8,577,810 | B1* | 11/2013 | Dalit et al. |
| 9,229,623 | B1 | 1/2016 | Penilla et al. |
| 9,747,587 | B2 | 8/2017 | Diehl |
| 9,770,206 | B2 | 9/2017 | Ashokan |
| 9,881,303 | B2 | 1/2018 | Vohra et al. |
| 9,972,004 | B1 | 5/2018 | Donavalli et al. |
| 2003/0046237 | A1 | 3/2003 | Uberti |
| 2005/0055582 | A1 | 3/2005 | Bazakos et al. |
| 2005/0165667 | A1 | 7/2005 | Cox |
| 2006/0160525 | A1 | 7/2006 | Watanabe |
| 2007/0136604 | A1* | 6/2007 | Kuhlman et al. |
| 2009/0005987 | A1 | 1/2009 | Vengroff et al. |
| 2009/0313129 | A1 | 12/2009 | Rothschild |
| 2010/0211966 | A1 | 8/2010 | Zhang et al. |
| 2011/0170739 | A1 | 7/2011 | Gillam et al. |
| 2011/0178883 | A1 | 7/2011 | Granbery et al. |
| 2011/0190055 | A1 | 8/2011 | Leyvand et al. |
| 2011/0238510 | A1 | 9/2011 | Rowen et al. |
| 2011/0257985 | A1 | 10/2011 | Goldstein |
| 2011/0307403 | A1 | 12/2011 | Rostampour et al. |
| 2012/0271717 | A1* | 10/2012 | Postrel |
| 2012/0310736 | A1* | 12/2012 | Vengroff et al. |
| 2013/0035979 | A1 | 2/2013 | Tenbrock |
| 2013/0159119 | A1 | 6/2013 | Henderson et al. |
| 2013/0223696 | A1* | 8/2013 | Azar et al. |
| 2013/0251216 | A1* | 9/2013 | Smowton et al. |
| 2014/0067649 | A1 | 3/2014 | Kannan et al. |
| 2014/0165187 | A1 | 6/2014 | Daesung et al. |
| 2014/0222596 | A1* | 8/2014 | Prakash et al. |
| 2014/0289833 | A1 | 9/2014 | Briceno et al. |
| 2014/0289834 | A1 | 9/2014 | Lindemann |
| 2014/0372128 | A1* | 12/2014 | sheets et al. |
| 2015/0046990 | A1 | 2/2015 | Oberheide et al. |
| 2015/0066671 | A1 | 3/2015 | Nichols et al. |
| 2015/0072618 | A1 | 3/2015 | Granbery |
| 2015/0073907 | A1 | 3/2015 | Purves et al. |
| 2015/0073980 | A1 | 3/2015 | Griffin et al. |
| 2015/0120473 | A1 | 4/2015 | Jung et al. |
| 2015/0161417 | A1 | 6/2015 | Kaplan et al. |
| 2015/0261787 | A1 | 9/2015 | Hu et al. |
| 2015/0278795 | A1* | 10/2015 | Jiang etal. |
| 2015/0309569 | A1 | 10/2015 | Kohlhoff et al. |
| 2015/0332258 | A1 | 11/2015 | Kurabi et al. |
| 2015/0356563 | A1* | 12/2015 | Vohra et al. |
| 2016/0012414 | A1* | 1/2016 | Chitilian etal. |
| 2016/0014406 | A1 | 1/2016 | Takahashi et al. |
| 2016/0027073 | A1 | 1/2016 | Eramian |
| 2016/0042346 | A1 | 2/2016 | Pastore et al. |
| 2016/0063496 | A1* | 3/2016 | Royyuru et al. |
| 2016/0072915 | A1 | 3/2016 | Decanne |
| 2016/0180150 | A1 | 6/2016 | Negi et al. |
| 2016/0253656 | A1 | 9/2016 | Dragushan et al. |
| 2016/0321633 | A1* | 11/2016 | Chandrasekaran et al. |
| 2016/0321671 | A1* | 11/2016 | Chandrasekaran et al. |
| 2016/0323274 | A1 | 11/2016 | Chandrasekaran et al. |
| 2017/0004507 | A1 | 1/2017 | Henderson et al. |
| 2017/0193480 | A1 | 7/2017 | Chandrasekaran et al. |
| 2018/0349939 | A1 | 12/2018 | Setchell et al. |
| 2019/0364039 | A1 | 11/2019 | Chandrasekaran et al. |

FOREIGN PATENT DOCUMENTS

| | | |
|---|---|---|
| GB | 2 368 951 A | 5/2002 |
| GB | 2513173 A | 10/2014 |
| JP | 2005346489 | 12/2005 |
| JP | 2006262333 | 9/2006 |
| JP | 2013522777 | 6/2013 |
| JP | 2016126749 | 7/2016 |
| WO | 2016/176517 A1 | 11/2016 |
| WO | 2016/176517 A8 | 11/2016 |
| WO | 2017/004602 A1 | 1/2017 |
| WO | 2018075227 A1 | 4/2018 |
| WO | 2018/222232 A1 | 12/2018 |

OTHER PUBLICATIONS

Berthon, "International Search Report and Written Opinion issued in International Application No. PCT/US2018/018443", dated Apr. 20, 2016, 14 pages.
Crawley, "U.S. Office Action issued in copending U.S. Appl. No. 14/791,239, filed Jul. 2, 2015", dated May 16, 2018, 14 pages.
Lander, "United Kingdom Office Action received for United Kingdom Patent Application No. 1715687.8", dated Jan. 16, 2018, 5 pages.
Nickitas-Etienne, "International Preliminary Report on Patentability issued in International Application No. PCT/US2016/040881", dated Jan. 11, 2018, 10 pages.
Lander, "United Kingdom Office Action received for United Kingdom Patent Application No. 1715687.8", dated May 25, 2018, 8 pages.
McCoy, "U.S. Office Action issued in copending U.S. Appl. No. 15/143,453, filed Apr. 29, 2016", dated Jun. 29, 2018, 16 pages.
Crawley, "U.S. Office Action issued in copending U.S. Appl. No. 14/791,239, filed Jul. 2, 2015", dated May 24, 2017, 29 pages.
Crawley, "U.S. Office Action issued in copending U.S. Appl. No. 14/791,239, filed Jul. 2, 2015", dated Oct. 13, 2017, 30 pages.
Lander, "United Kingdom Office Action received for United Kingdom Patent Application No. 1715687.8", dated Oct. 31, 2017, 7 pages.
Moon, "International Preliminary Report on Patentability issued in International Application No. PCT/US2016/029898", dated Nov. 9, 2017, 9 pages.
McCoy, "U.S. Office Action issued in copending U.S. Appl. No. 15/143,453, filed Apr. 29, 2016", dated Nov. 27, 2017, 11 pages.
Van Der Weiden, "International Search Report and Written Opinion issued in International Application No. PCT/US2017/054621", dated Nov. 29, 2017, 13 pages.
Berthon, "International Search Report and Written Opinion issued in International Application No. PCT/US2016/029898", dated Jul. 22, 2016, 12 pages.
Crawley, "U.S. Office Action issued in copending U.S. Appl. No. 14/791,239, filed Jul. 2, 2015", dated Oct. 5, 2016, 18 pages.
Keoh-Lehmann, "International Search Report and Written Opinion issued in International Application No. PCT/US2016/040881", dated Aug. 26, 2016, 14 pages.
Ullah Masud, "U.S. Office Action issued in copending U.S. Appl. No. 14/701,517, filed Apr. 30, 2015", dated Jun. 15, 2016, 11 pages.
U.S. Appl. No. 14/701,517 to Chandrasekaran et al. filed Apr. 30, 2015.
U.S. Appl. No. 15/462,772 to Chandrasekaran et al. filed Mar. 17, 2017.
U.S. Appl. No. 14/791,239 to Henderson et al. filed Jul. 2, 2015.

(56) References Cited

OTHER PUBLICATIONS

U.S. Appl. No. 15/143,451 to Chandrasekaran et al. filed Apr. 29, 2016.
U.S. Appl. No. 15/143,453 to Chandrasekaran et al. filed Apr. 29, 2016.
Crawley, "U.S. Office Action issued in copending U.S. Appl. No. 14/791,239, filed Jul. 2, 2015", dated Sep. 18, 2018, 25 pages.
Lander, "United Kingdom Office Action received for United Kingdom Patent Application No. 1715687.8", dated Aug. 17, 2018, 6 pages.
Lander "United Kingdom Office Action received for United Kingdom Patent Application No. 1715687.8", dated Jan. 10, 2019, 14 pages.
Danzig "U.S. Office Action issued in copending U.S. Appl. No. 15/143,451, filed Apr. 29, 2016", dated Apr. 1, 2019, 15 pages.
"German Office Action issued in German Application No. 11-2016-001971.8", dated Mar. 27, 2019, 7 pages of German Office Action only.
Wittmann-Regis "International Preliminary Report on Patentability issued in International Application No. PCT/US2017/054621", dated May 2, 2019, 7 pages.
Masud "U.S. Office Action issued in copending U.S. Appl. No. 15/462,772, filed Mar. 17, 2017", dated Apr. 16, 2019, 10 pages.
Crawley, "U.S. Office Action issued in co-pending U.S. Appl. No. 14/791,239, filed Jul. 2, 2015", dated Jun. 11, 2019, 22 pages.
Crawley "U.S. Office Action issued in copending U.S. Appl. No. 14/791,239, filed Jul. 2, 2015", dated Oct. 3, 2019, 21 pages.
Danzig "U.S. Office Action issued in copending U.S. Appl. No. 15/143,451, filed Apr. 29, 2016", dated Oct. 16, 2019, 22 pages.
Lander "United Kingdom Office Action received for United Kingdom Patent Application No. 1715687.8", dated Oct. 21, 2019, 2 pages.
Thielemann "European Office Action issued in European Application No. 16738639.0", dated Aug. 9, 2019, 4 pages.
U.S. Appl. No. 16/534,701 to Sashikanth Chandrasekaran et al. filed on Aug. 7, 2019.
Sinsky "Square Introduces Hands-free Payments", CNET, Nov. 2, 2011, 4 pages.

\* cited by examiner

225

Transmitting, by an account management system, encrypted identification information to a merchant point of sale device and a corresponding cryptographic key to a user computing device

610

Account management system predicts that user will arrive at merchant system location

620

Account management system generates cryptographic key and transmits cryptographic key to user computing device

630

User computing device receives cryptographic key

640

Account management system encrypts identification information associated with the user account that is able to be decrypted using the encryption key

650

Account management system transmits encrypted identification information of user to merchant point of sale device

660

Merchant point of sale device receives encrypted identification information of user 230, Fig. 2

Receiving, by a merchant point of sale device, an encryption key from a user computing device and decrypting identification information associated with a user using the encryption key

710

User enters merchant system location with user computing device and signs in to payment application

720

User computing device transmits encryption key to merchant point of sale device

730

Merchant point of sale device receives encryption key from user computing device

740

Merchant point of sale device decrypts user identification information

750

Merchant point of sale device retrieves user facial template from user identification information and adds the facial template to current customer log

760

Merchant point of sale device edits current customer log as users enter and leave merchant system location 250, Fig. 2

Figure 7

OFFLINE USER IDENTIFICATION

TECHNICAL FIELD

The present disclosure relates to user identification by sending advance, encrypted identification information to a location for later decryption using a key provided when the user arrives at the location.

BACKGROUND

When consumers visit a merchant location, many methods of conducting a transaction are available. Consumers may establish an account with an account management system and upload data to the account that can be communicated to a service provider computing device in response to the consumer initiating a service request at the service provider computing device.

Current applications may require a consumer device associated with the consumer to establish a network connection with an identification system at the time of a service request to communicate a location of the consumer device. Additionally, current applications may require a merchant computing device associated with a location to establish a network connection with the identification system to receive facial templates associated with consumer devices currently identified as being at or within a proximity of the location to use to identify the consumer. Current applications do not provide for sending, from the identification system at a time before the service request, encrypted consumer information to the merchant computing device associated with consumers that may visit the location at a later time. Current applications also do not provide for sending a shared encryption key to the consumer device and the merchant computing device that may be communicated from the consumer device to the merchant computing device at the location without requiring the consumer device or the merchant computing device to communicate with the identification system at the time of the service request.

SUMMARY

Techniques herein provide computer-implemented methods to identify a user via facial recognition using encrypted user identification information. A management system communicates advance, encrypted user identification data associated with users anticipated to visit a location to a computing device at the location and also communicate encryption keys to user computing devices associated with the users, so that the users may be identified by the computing device at the location.

In an example embodiment, a provider system registers with a management computing system. A user also registers with the management system via a user computing device and transmits an image of himself to the management system to establish a facial template associated with the user. The management system encrypts user identification information, including the facial template and other user information, using an encryption key. The management system transmits the encrypted identification information to a provider computing device at a provider location, and separately transmits the encryption key to the user computing device. A user enters the provider location carrying the user computing device. The provider computing device receives the encryption key from the user device and decrypts the identification information associated with the user using the encryption key. The user initiates an identification process at the provider computing device, and the provider computing device verifies the identity of the user via the facial template associated with the user by capturing an image of the user via a camera device, generating a facial template, and comparing the generated facial template to the facial template associated with the user from the decrypted user identification information. If the facial templates match, then the user is identified.

After the identification process, the provider computing device transmits interaction details and a user identifier to the management system, which transmits user data to the provider computing device for selection by the user for use. The provider computing device generates an authorization request for the interaction based on the selected user data.

In certain other example aspects described herein, systems and computer program products to identify users via facial recognition are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 6 is a block flow diagram depicting a method for transmitting, by an account management system, encrypted identification information to a merchant point of sale device and a corresponding cryptographic key to a user computing device, in accordance with certain example embodiments.

FIG. 7 is a block flow diagram depicting a method for receiving, by a merchant point of sale device, an encryption key from a user computing device and decrypting identification information associated with a user using the encryption key, in accordance with certain example embodiments.

DETAILED DESCRIPTION OF EXAMPLE EMBODIMENTS

Overview

Figure 1:
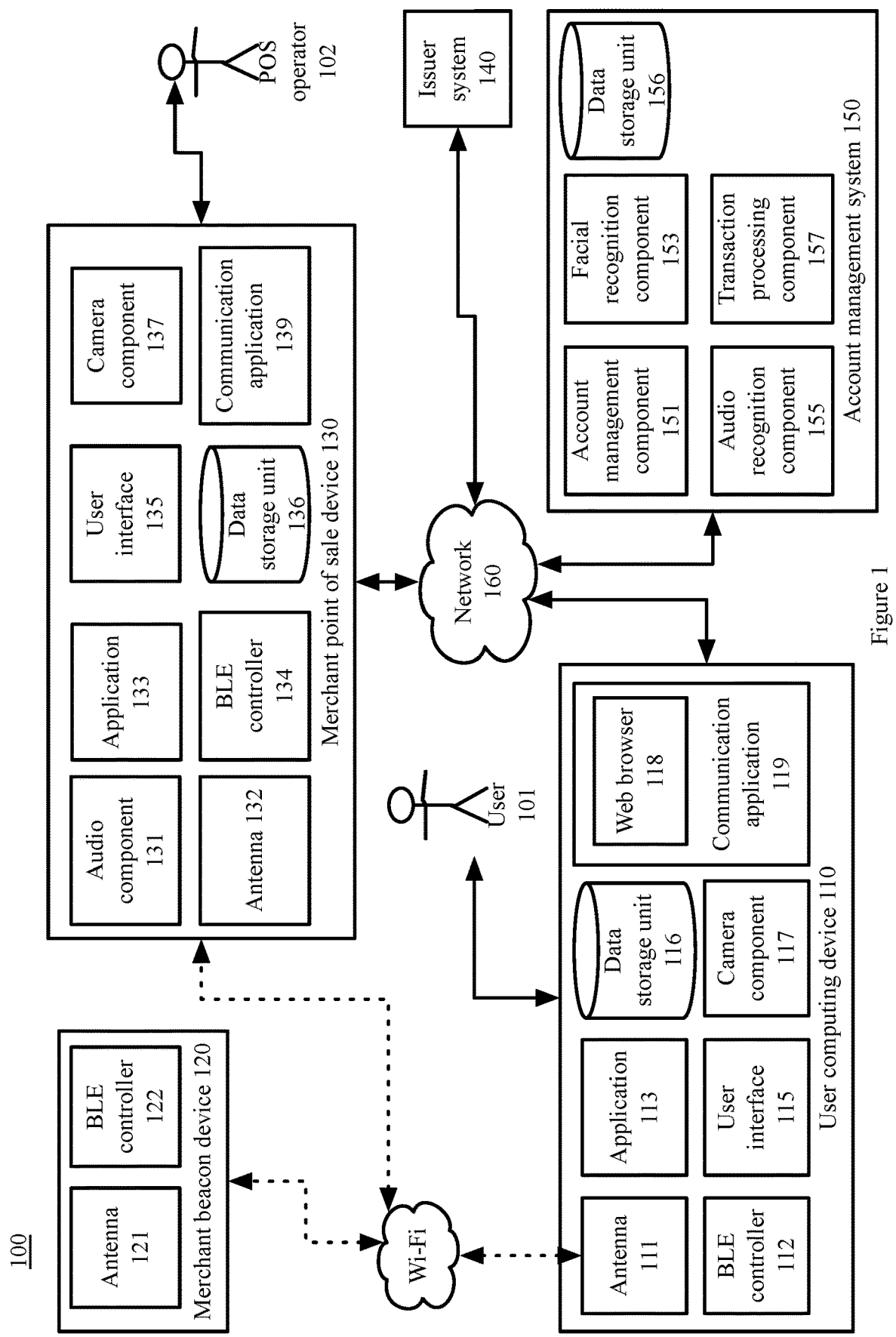
FIG. 1 is a block diagram depicting a system for communicating encrypted user identification data associated with users anticipated to visit a location to a computing device at the location and to communicate encryption keys to user computing devices associated with the users so that the users may be identified in service requests initiated at the computing device, in accordance with certain example embodiments.

The example embodiments described herein provide computer-implemented techniques for communicating encrypted user identification data associated with users anticipated to visit a location to a computing device at the location and to communicate encryption keys to user computing devices associated with the users so that the users may be identified in service requests initiated at the computing device.

In an example embodiment, a merchant system or other service provider system registers with an account management system. A user establishes an account with the account management system and transmits an image of himself to the account management system to establish a facial template associated with the user account. The account management system transmits, to a merchant point of sale device at a merchant location, identification information and transmits a shared encryption key to the user computing device. A user enters the merchant location carrying the user computing device. The merchant point of sale device receives the encryption key from the user device and decrypts the identification information associated with the user using the encryption key. The user initiates a transaction at the merchant point of sale device and the merchant point of sale device verifies the identity of the user via the facial template associated with the user by capturing an image of the user via a camera device, generating a facial template, and comparing the generated facial template to the facial template associated with the user to identify the user. The merchant point of sale device transmits transaction details and a user identifier to the account management system, which transmits user account data to the merchant point of sale device for selection of a particular account by the merchant point of sale device operator as directed by the user for use in the transaction. The merchant point of sale device generates a transaction authorization request to transmit to an issuer system associated with the user account selected for use in the transaction. The account management system receives an approval of the transaction authorization request and transmits a receipt to the merchant point of sale device.

In an example embodiment, a merchant system or service provider system registers with an account management system. The merchant system installs one or more merchant point of sale devices and one or more merchant camera devices at a merchant system location. A merchant system operator installs a payment application on each of the one or more merchant point of sale devices. A user establishes an account with the account management system and downloads an application to a user computing device associated with and operated by the user. In an example, the user transmits an image of himself and/or an audio recording of himself to the account management system associated with the user account. In this example, the account management system generates the facial template based on the received facial image of the user and/or the audio template based on the received audio recording of the user and deletes the facial template and/or audio template. In another example, the user configures a challenge and response to associate with the user account, and the account management system receives the configuration of the challenge and response via the user computing device. For example, the challenge and response may comprise a question and answer. In this example, the question may read "What is your mother's maiden name?" and the answer may read "Smith." In another example, the challenge and response may comprise a request for a password and a password.

The account management system predicts that the user will arrive at the merchant system location at a later time. The account management system generates a cryptographic key, transmits the cryptographic key to the user computing device, and the user computing device receives the cryptographic key. In this example, the account management system encrypts identification information associated with the user using the cryptographic key and transmits the encrypted identification information to a merchant point of sale device at the merchant system location. In another example embodiment, the account management system predicts that one or more users will arrive at the merchant system location at a later time. In this example embodiment, the account management system, for each user, generates a cryptographic key and, for each user, transmits the generated cryptographic key to the respective user computing device associated with the respective user. In this other example embodiment, the account management system, for each user, encrypts identification information for the respective user using the respective generated encryption key and transmits each respective encrypted identification information to the merchant point of sale device at the merchant system location. In an example embodiment, the merchant point of sale device receives the encrypted identification information for each user that the account management system determines may visit the merchant system location at a later time.

The user enters the merchant system location with the user computing device. In an example embodiment, the user signs into the payment application on the user computing device after entering the merchant system location or otherwise signs into the payment application before entering the merchant system location. The user computing device transmits, via wireless communication and to the merchant point of sale device, the cryptographic key received from the account management system. The merchant point of sale device receives the cryptographic key from the user computing device. In another example embodiment, one or more users enter the merchant system location, each with a respective user computing device, wherein each respective user computing device transmits, to the merchant point of sale device via wireless communication, a respective cryptographic key received from the account management system. In an example embodiment, for each of the one or more received cryptographic keys from each respective user computing device, the merchant point of sale device identifies encrypted identification information able to be decrypted by the cryptographic key and decrypts the encrypted identification information. In this example embodiment, for each of the one or more identification information decrypted using the respective one or more cryptographic keys, the merchant point of sale device retrieves a user facial template form the respective identification information and adds the facial template to a current customer log. In an example embodiment, the merchant point of sale device edits the current customer log as users enter and leave the merchant system location. For example, if a subsequent user enters the merchant system location carrying a subsequent user computing device that received a particular cryptographic key from the account management system, the subsequent user computing device transmits the particular cryptographic key to the merchant point of sale device. In this example, the merchant point of sale device previously received, from the account management system, encrypted identification information associated with the subsequent user and the merchant point of sale device decrypts the encrypted identification information using the received particular cryptographic key. In this example, the merchant point of sale device extracts a facial template associated with the subsequent user from the decrypted identification information and adds the facial template associated with the subsequent user to the current customer log. In another example, after a length of time passes beginning at the time at which a facial template is added to the current customer log, for example 20 minutes, if the facial template has not been used to verify an identity, the facial template is deleted from the current customer log.

In another example embodiment, the user signs into the application via the user computing device or is otherwise already signed into the application via the user computing device before entering the merchant system location. The user computing device receives a merchant beacon device identifier from a merchant beacon device via a local wireless network at the merchant system location and transmits the identifier to the account management system via a network. For example, the user computing device may periodically scan for wireless network devices and may detect the merchant beacon device identifier broadcast from the merchant beacon device via the scan for wireless network devices. In an example embodiment, the account management system transmits facial templates to the merchant point of sale device that correspond to any users whose user computing devices are within network range of the merchant beacon device and/or who are signed into the application and retransmit the merchant beacon device identifier to the account management system. In an example embodiment, the merchant point of sale device stores facial templates received from the account management system in the current customer log.

The merchant camera device captures a facial image of the user, generates a facial template of the user based on the facial image, and identifies the user by comparing the user's captured facial image to the facial templates in the current customer log. Alternatively, the user submits an audio recording to the merchant point of sale device, which generates an audio template of the user based on the received audio input and identifies the user based on comparing the generated audio template against audio templates in the current customer log. In yet another example, the merchant point of sale device operator identifies the user based on a user's response to a challenge by comparing a received challenge and response to the challenge and response associated with the user's account.

In an example embodiment, the merchant point of sale device transmits an account identifier associated with the identified user to the account management system, which transmits payment account information associated with an account of the identified user. In an example embodiment, the merchant point of sale device displays one or more payment account identifiers for use in the transaction. In an example, the merchant point of sale device operator, upon direction of the user, selects a particular payment account for use in the transaction. The merchant point of sale device transmits transaction details to the account management system and an indication of the particular payment account selected for use in the transaction and the account management system generates a transaction authorization request.

The account management system transmits the transaction authorization request to an issuer system that corresponds to the selected particular payment account. The account management system receives an approval of the transaction authorization request and transmits a receipt to the merchant point of sale device.

In another example, after identifying the user, the merchant point of sale device displays user information associated with the user and the merchant point of sale device operator determines whether the user is eligible for a service based on the displayed user information. In this example, the merchant point of sale device operator, in response to determining that the user is eligible for the service, provides the user with access to the service. In certain example embodiments, in response to determining that the user is not eligible for a transaction and/or for a service, the merchant point of sale device operator informs the user that the user is not eligible for the respective transaction or service. The merchant point of sale device operator may further select or additional user interface objects on the interface of the merchant point of sale device to cancel a transaction and/or a service in accordance with determining that the user not eligible.

In other example embodiments described herein, one or more actions described herein as being performed by a merchant system, a merchant system operator, a merchant system point of sale device, a merchant beacon device may be performed by a service provider system, an operator associated with the service provider system, a computing device associated with the service provider system, and a beacon device associated with the service provider system, respectively. Likewise, one or more actions described herein as occurring at a merchant system location may occur at a service provider system location. An example merchant system may comprise a brick and mortar store location, a toll booth, a ticketing office, a supermarket, or other location where users may engage in transactions for goods or services with the merchant system. An example service provider system may comprise a restricted access building, restricted access location, a border crossing, a security gate, a service that provides restricted information to users, a customer service location, or other appropriate service provider system.

By using and relying on the methods and systems described herein, the account management system, the merchant point of sale device, and the user computing device enable verification of an identity of a user without requiring communication between a point of sale device and an account management system and/or a user computing device and an account management system, as required in current technology. As such, the systems and methods described herein may reduce the bandwidth usage required by devices at the merchant system location and the inputs required by the devices.

Example System Architecture

Turning now to the drawings, in which like numerals indicate like (but not necessarily identical) elements throughout the figures, example embodiments are described in detail.

FIG. 1 is a block diagram depicting a system 100 for communicating encrypted user 101 identification data associated with users 101 anticipated to visit a location to a merchant point of sale device 130 at the location and to communicate encryption keys to user computing devices 110 associated with the users 101 so that the users 101 may be identified in service requests initiated at the merchant point of sale device 130, in accordance with certain example embodiments. As depicted in FIG. 1, the system 100 includes network computing devices 110, 120, 130, 140, and 150 that are configured to communicate with one another via one or more networks 160. In some embodiments, a user associated with a device must install an application and/or make a feature selection to obtain the benefits of the techniques described herein.

In example embodiments, the network 160 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, 140, and 150 comprises a device having a communication device capable of transmitting and receiving data over the network 160. For example, each network computing device 110, 120, 130, 140, and 150 can comprises a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, 140, and 150 are operated by users 101, merchant beacon device 120 operators, merchant point of sale ("POS") device 130 operators, issuer system 140 operators, and account management system 150 operators, respectively.

An example user computing device 110 comprises an antenna 111, a Bluetooth low energy ("BLE") controller 112, an application 113, a user interface 115, a data storage unit 116, a camera component 117, a web browser 118, and a communication application 119.

In an example embodiment, the antenna 111 is a means of communication between the user computing device 110 and a merchant point of sale device 130 and/or a merchant beacon device 120. In an example embodiment, a BLE controller 112 outputs through the antenna 111 a radio signal, or listens for radio signals from the merchant point of sale device 130 and/or the merchant beacon device 120. In another example embodiment a Bluetooth controller, Wi-Fi controller, or a near field communication ("NFC") controller is used. In an example embodiment, the BLE controller 112 outputs through the antenna 111 a radio signal, or listens for radio signals from the merchant point of sale device 130 and/or merchant beacon device 120.

In an example embodiment, the BLE controller 112 is capable of sending and receiving data, performing authentication and ciphering functions, and directing how the user computing device 110 will listen for transmissions from the merchant beacon device 120 or configuring the user computing device 110 into various power-save modes according to BLE-specified procedures. In another example embodiment, the user computing device 110 comprises a Bluetooth controller, Wi-Fi controller, or an NFC controller capable of performing similar functions. An example BLE controller 112 communicates with the application 113 and is capable of sending and receiving data over a wireless, BLE communication channel. In another example embodiment, a Bluetooth controller 112, Wi-Fi controller 112, or NFC controller 112 performs similar functions as the BLE controller 112 using Bluetooth or NFC protocols. In an example embodiment, the BLE controller 112 activates the antenna 111 to create a wireless communication channel between the user computing device 110 and the merchant point of sale device 130 and/or merchant beacon device 120. The user computing device 110 communicates with the merchant point of sale device 130 and/or merchant beacon device 120 via the antenna 111. In an example embodiment, when the user computing device 110 has been activated, the BLE controller 112 polls through the antenna 111 a radio signal, or listens for radio signals from the merchant point of sale device 130 and/or merchant beacon device 120.

In an example embodiment, the application 113 is a program, function, routine, applet, or similar entity that exists on and performs its operations on the user computing device 110. In certain example embodiments, the user 101 must install the application 113 and/or make a feature selection on the user computing device 110 to obtain the benefits of the techniques described herein. In an example embodiment, the user 101 may access the application 113 on the user computing device 110 via the user interface 115. In an example embodiment, the application 113 may be associated with the account management system 150. In another example embodiment, the application 113 may be associated with a merchant system associated with the merchant point of sale device 130 and/or the merchant beacon device 120. In yet another example embodiment, two applications 113 exist, one associated with the merchant system and another associated with the account management system 150. In another example embodiment, the application 113 may be associated with a service provider system associated with a beacon device 120 or service provider computing device. For example, the service provider computing device may perform one or more functions herein described as being performed by the merchant point of sale device 130.

In an example embodiment, the user interface 115 enables the user 101 to interact with the application 113 and/or web browser 118. For example, the user interface 115 may be a touch screen, a voice-based interface, or any other interface that allows the user 101 to provide input and receive output from an application or module on the user computing device 110. In an example embodiment, the user 101 interacts via the user interface 115 with the application 113 and/or web browser 118 to configure user 101 accounts on the account management system 160. In another example embodiment, the user 101 interacts via the user interface 115 with the application 113 and/or the web browser 118 to enable transactions involving payment account data stored on the user computing device 110, if needed.

In an example embodiment, the data storage unit 116 comprises a local or remote data storage structure accessible to the user computing device 110 suitable for storing information. In an example embodiment, the data storage unit 116 stores encrypted information, such as HTML5 local storage.

In an example embodiment, the camera component 117 may be any device, component, or function of the user computing device 110 that obtains a digital image. The camera component 117 may be resident on the user computing device 110 or in any manner logically connected to the user computing device 110. For example, the camera component 117 may be connected to the user computing device 110 via the network 160. The camera component 117 may be capable of obtaining individual images or a video scan. Any other suitable image capturing device may be represented by the camera component 117.

In an example embodiment, the user 101 can use a communication application 119, such as a web browser 118 application or a stand-alone application, to view, download, upload, or otherwise access documents or web pages via a distributed network 160.

In an example embodiment, the web browser 118 can enable the user 101 to interact with web pages using the user computing device 110. In an example embodiment, the user 101 may access the user's 101 account maintained by the account management system 150 via the web browser 118. In another example embodiment, the user 101 may access a merchant system website via the web browser 118. In certain example embodiments described herein, one or more functions performed by the application 113 may also be performed by a web browser 118 application associated with the account management system 160.

In an example embodiment, the communication application 119 can interact with web servers or other computing devices connected to the network 160, including the user computing device 110 and a web server of a merchant system.

In certain example embodiments, one or more functions herein described as performed by the application 113 may also be performed by a web browser 118 application, for example, a web browser 118 application associated with a merchant system website or associated with the account management system 150. In certain example embodiments, one or more functions herein described as performed by the application 113 may also be performed by the user computing device 110 operating system. In certain example embodiments, one or more functions herein described as performed via the web browser 118 may also be performed via the application 113.

In other example embodiments described herein, one or more actions described herein as being performed by a merchant system, a merchant system point of sale device 130 operator, a merchant system point of sale device 130, or a merchant beacon device 120 may be performed by a service provider system, an operator associated with the service provider system, a computing device associated with the service provider system, or a beacon device associated with the service provider system, respectively. Likewise, one or more actions described herein as occurring at a merchant system location may occur at a service provider system location. An example merchant system may comprise a brick and mortar store location, a toll booth, a ticketing office, a supermarket, or other location where users may engage in transactions for goods or services with the merchant system. An example service provider system may comprise a restricted access building, restricted access location, a border crossing, a security gate, a service that provides restricted information to users, a customer service location, or other appropriate service provider system.

An example merchant beacon device 120 comprises an antenna 121 and a BLE controller 122. In an example embodiment, a merchant system location comprises one or more merchant beacon devices 120 installed at the merchant system location. In an example, the merchant beacon device 120 comprises a component of the merchant point of sale device 130. In an example, the account management system 150 may comprise a database that correlates merchant beacon device 120 identifiers with merchant point of sale device 130 identifiers for associated merchant point of sale devices 130. For example, a merchant point of sale device 130 identifier may comprise hardware identifier specific to the device such as a serial number or a MAC ID. In another example, a merchant beacon device 120 identifier may comprise a hardware identifier specific to the beacon device or an identifier generated by the account management system 150 and stored in the merchant beacon device 120. An example merchant beacon device 120 is programmed to broadcast, emit, or otherwise transmit a particular merchant beacon device 120 identifier over a wireless network 160 to any user computing devices 110 within a threshold distance required to maintain the wireless network 160. For example, the wireless network 160 may comprise a Wi-Fi network 160, a Bluetooth network 160, a Bluetooth low energy ("BLE") network 160, an NFC network 160, or any other appropriate wireless network 160.

In an example embodiment, the antenna 121 is a means of communication between the merchant beacon device 120 and the user computing device 110. In an example embodiment, a BLE controller 122 outputs through the antenna 121 a radio signal, or listens for radio signals from the user computing device 110. In another example embodiment a Bluetooth controller, Wi-Fi controller, or a NFC controller is used. In an example embodiment, the BLE controller 122 outputs through the antenna 121 a radio signal, or listens for radio signals from the payment card device 120.

In an example embodiment, the BLE controller 122 is capable of sending and receiving data, performing authentication and ciphering functions, and directing how merchant beacon device 120 will listen for transmissions from the user computing device 110 or configuring the merchant beacon device 120 into various power-save modes according to BLE-specified procedures. In another example embodiment, the merchant beacon device 120 comprises a Bluetooth controller, Wi-Fi controller, or an NFC controller capable of performing similar functions. An example BLE controller 122 communicates with the application 113 and is capable of sending and receiving data over a wireless, BLE communication channel. In another example embodiment, a Bluetooth controller 122, Wi-Fi controller 122, or NFC controller 122 performs similar functions as the BLE controller 122 using Bluetooth, Wi-Fi, or NFC protocols. In an example embodiment, the BLE controller 122 activates the antenna 121 to create a wireless communication channel between the user computing device 110 and the merchant beacon device 120. The merchant beacon device 120 communicates with the user computing device 110 via the antenna 121. In an example embodiment, when the merchant beacon device 120 has been activated, the BLE controller 122 polls through the antenna 121 a radio signal, or listens for radio signals from the user computing device 110.

An example merchant point of sale device 130 comprises an audio component 131, an antenna 132, an application 133, a BLE controller 134, a user interface 135, a data storage unit 136, and a communication application 139.

In an example embodiment, the antenna 131 is a means of communication between the merchant point of sale device 130 and the user computing device 110. In an example embodiment, a BLE controller 134 outputs through the antenna 132 a radio signal, or listens for radio signals from the user computing device 110. In another example embodiment a Bluetooth controller, Wi-Fi controller, or a NFC controller is used instead of the BLE controller 134. In an example embodiment, the BLE controller 134 outputs through the antenna 132 a radio signal, or listens for radio signals from the merchant beacon device 120.

In an example embodiment, the audio component 131 may be any component, application, or function of the merchant POS device 130 that captures an audio input of an external environment of the merchant POS device 130. The audio component 131 may be resident on the merchant POS device 130 or in any manner logically connected to the merchant POS device 130. For example, the audio component 131 may be connected to the merchant POS device 130 via the network 170. The audio component 131 may be capable of obtaining an audio recording. Any suitable audio recording device may be represented by the audio component 131.

In an example embodiment, the application 133 is a program, function, routine, applet, or similar entity that exists on and performs its operations on the merchant point of sale device 130. In certain example embodiments, the merchant point of sale ("POS") device operator 102 or other merchant system operator must install the application 133 and/or make a feature selection on the merchant point of sale device 130 to obtain the benefits of the techniques described herein. In an example embodiment, the merchant POS device operator 102 may access the application 133 on the merchant POS device 130 via the user interface 135. In an example embodiment, the application 133 may be associated with the account management system 150. In another example embodiment, the application 133 may be associated with a merchant system. In yet another example embodiment, two applications 133 exist, one associated with the merchant system and another associated with the account management system 150.

In certain other example embodiments, the application 133 is a program, function, routine, applet, or similar entity that exists on and performs its operations on the computing device associated with the service provider system. In certain example embodiments, the computing device operator must install the application 133 and/or make a feature selection on the computing device to obtain the benefits of the techniques described herein. In an example embodiment, the service provider system computing device operator may access the application 133 on the computing device via a user interface of the computing device. In an example embodiment, the application 133 may be associated with the account management system 150. In another example embodiment, the application 133 may be associated with a service provider system associated with a beacon device and a camera device installed at the service provider system location.

In an example embodiment, the BLE controller 134 is capable of sending and receiving data, performing authentication and ciphering functions, and directing how merchant point of sale device 130 will listen for transmissions from the user computing device 110 and/or merchant beacon device 120. In another example embodiment, the merchant point of sale device 130 comprises a Bluetooth controller, Wi-Fi controller, or an NFC controller capable of performing similar functions to the BLE controller 134. An example BLE controller 134 communicates with the application 133 and is capable of sending and receiving data over a wireless, BLE communication channel to communicate to the application 133. In another example embodiment, a Bluetooth controller 134, Wi-Fi controller 134, or NFC controller 134 performs similar functions as the BLE controller 134 using Bluetooth, Wi-Fi, or NFC protocols. In an example embodiment, the BLE controller 134 activates the antenna 131 to create a wireless communication channel between the merchant point of sale device 130 and the user computing device 110. The merchant point of sale device 130 communicates with the user computing device 110 and/or the merchant beacon device 120 via the antenna 131. In an example embodiment, the BLE controller 134 polls through the antenna 132 a radio signal, or listens for radio signals from the user computing device 110 and/or the merchant beacon device 120.

In an example embodiment, the user interface 135 enables the merchant POS device operator 102 to interact with the merchant POS device 130. For example, the user interface 135 may be a touch screen, a voice-based interface, or any other interface that allows the merchant POS device operator 102 to provide input and receive output from an application on the merchant POS device 130. In an example embodiment, the merchant POS device operator 102 interacts via the user interface 135 with the application 133.

In an example embodiment, the data storage unit 136 comprises a local or remote data storage structure accessible to the merchant POS device 130 suitable for storing information. In an example embodiment, the data storage unit 136 stores encrypted information, such as HTML5 local storage.

In an example embodiment, the camera component 137 may comprise any component, application, or function of the merchant POS device 130 that captures a video input or captures a digital image of an external environment of the merchant POS device 130. In an example, the camera component 137 comprises a lens and an application that processes an input of an environment captured by the lens to produce an image. The camera component 137 may be resident on the merchant POS device 130 or in any manner logically connected to the merchant POS device 30. For example, the camera component 137 may be connected to the merchant POS device 130 via the network 160. The camera component 137 may be capable of obtaining individual images or a video scan. Any other suitable image-capturing device may be represented by the camera component 137.

In an example embodiment, the camera component 137 comprises a processor, a data storage unit, a camera, and a communication application. For example, the processor performs one or more functions or processes described herein as being performed by the camera component 137. In another example, the operating system of the merchant point of sale device 130 performs one or more functions or processes described herein as being performed by the camera component 137.

In an example embodiment, the communication application 139, such as a web browser application or a stand-alone application, enables an operator of the merchant POS device 130 to view, download, upload, or otherwise access documents or web pages via a distributed network 160. For example, the communication application 139 may enable communication over the network 160 with the account management system 160.

An example issuer system 140 approves or denies a payment authorization request received from the account management system 150. In an example embodiment, the issuer system 140 communicates with the account management system 150 over the network 160. In an example embodiment, the issuer system 140 communicates with an acquirer system to approve a credit authorization and to make payment to the account management system 150 and/or merchant system. For example, the acquirer system is a third party payment processing company.

An example account management system 150 comprises an account management component 151, a facial recognition component 153, an audio recognition component 155, a data storage unit 156, and a transaction processing component 157.

In an example embodiment, the account management component 151 manages one or more user 101 accounts. In an example embodiment, a user 101 account may comprise a digital wallet account, an email account, a social networking account, or any other account associated with the account management system 160. In an example embodiment, the account management system 161 communicates with an application 113 operating on a user computing device 110 associated with a user 101 having a user 101 account with the account management system 150. In an example embodiment, the user 101 enters payment account information into the user 101 account via the application 113 of the user computing device 110 and the account management component 161 receives the payment account information over the network 160 and associates the received payment account information with the user 101 account. In an example embodiment, the user 101 account information comprises a name of the user 101, contact information of the user 101 such as an address or telephone number, demographic information of the user 101, one or more indicators of membership (or lack thereof) of the user in clubs or programs, and/or additional relevant user 101 account information.

In an example embodiment, the facial recognition component 163 receives a facial image of a user 101 associated with a user 101 account submitted by the user 101 via the user computing device 110 over the network 160. For example, the user 101 submits the facial image at the time the user 101 establishes the user 101 account with the account management system 150 or at any time thereafter. In an example embodiment, the user 101 submits an updated facial image. In an example embodiment, the facial recognition component 153 generates a facial template based on a received facial image.

In an example embodiment, the audio recognition component 155 receives a audio recording of a user 101 associated with a user 101 account submitted by the user 101 via the user computing device 110 over the network 160. For example, the user 101 submits the audio recording at the time the user 101 establishes the user 101 account with the account management system 150 or at any time thereafter. In an example embodiment, the audio recognition component 155 generates an audio template based on the received audio recording of the user 101. In an example embodiment, the audio recognition component 155 receives an audio recording of a first user 101 and compares the audio recording of the first user 101 against a stored audio template associated with the user 101 in the event that the user 101 is unable to be identified via facial image recognition. In this example, the audio recognition component 155 identifies the user 101 account corresponding to the stored audio template.

In an example embodiment, the data storage unit 156 comprises a local or remote data storage structure accessible to the account management system 150 suitable for storing information. In an example embodiment, the data storage unit 156 stores encrypted information, such as HTML5 local storage.

In an example embodiment, the transaction processing component 157 receives transaction details from a merchant POS device 130 and a request to initiate a transaction. Example transaction details comprise merchant system account information, a total amount of the transaction, and a user 101 selection of a user 101 payment account associated with the user's 101 account with the account management system 160. For example, the user's 101 account is a digital wallet account comprising information for one or more payment accounts of the user 101. In an example embodiment, the transaction processing component 157 extracts payment account information from the user 101 account corresponding to the user 101 selection of the user 101 payment account received in the transaction details from the merchant POS device 130. In an example embodiment, the transaction processing component 157 transmits a payment authorization request to an issuer system 140 or other appropriate financial institution associated with the payment account selected by the user 101 for use in the transaction. An example payment authorization request may comprise merchant system payment account information, user 101 payment account information, and a total amount of the transaction. In an example embodiment, after the issuer system 140 processes the payment authorization request, and the transaction processing component 157 receives an approval or denial of the payment authorization request from the issuer system 140 over the network 160. In an example embodiment, the transaction processing component 157 transmits a receipt to the merchant POS device 130 and/or the user computing device 110 comprising a summary of the transaction.

It will be appreciated that the network connections shown are example and other means of establishing a communications link between the computers and devices can be used. Moreover, those having ordinary skill in the art having the benefit of the present disclosure will appreciate that the user computing device 110, the merchant beacon device 120, the merchant point of sale device 130, the issuer system 140, and the account management system 150 illustrated in FIG. 1 can have any of several other suitable computer system configurations. For example, a user computing device 110 embodied as a mobile phone or handheld computer may or may not include all the components described above. In an example embodiment, the merchant point of sale device 130 and/or the merchant beacon device 120 may comprise separate components or may comprise components of another device. For example, the merchant point of sale device 130 may comprise the merchant beacon device 120 or vice versa.

Figure 10:
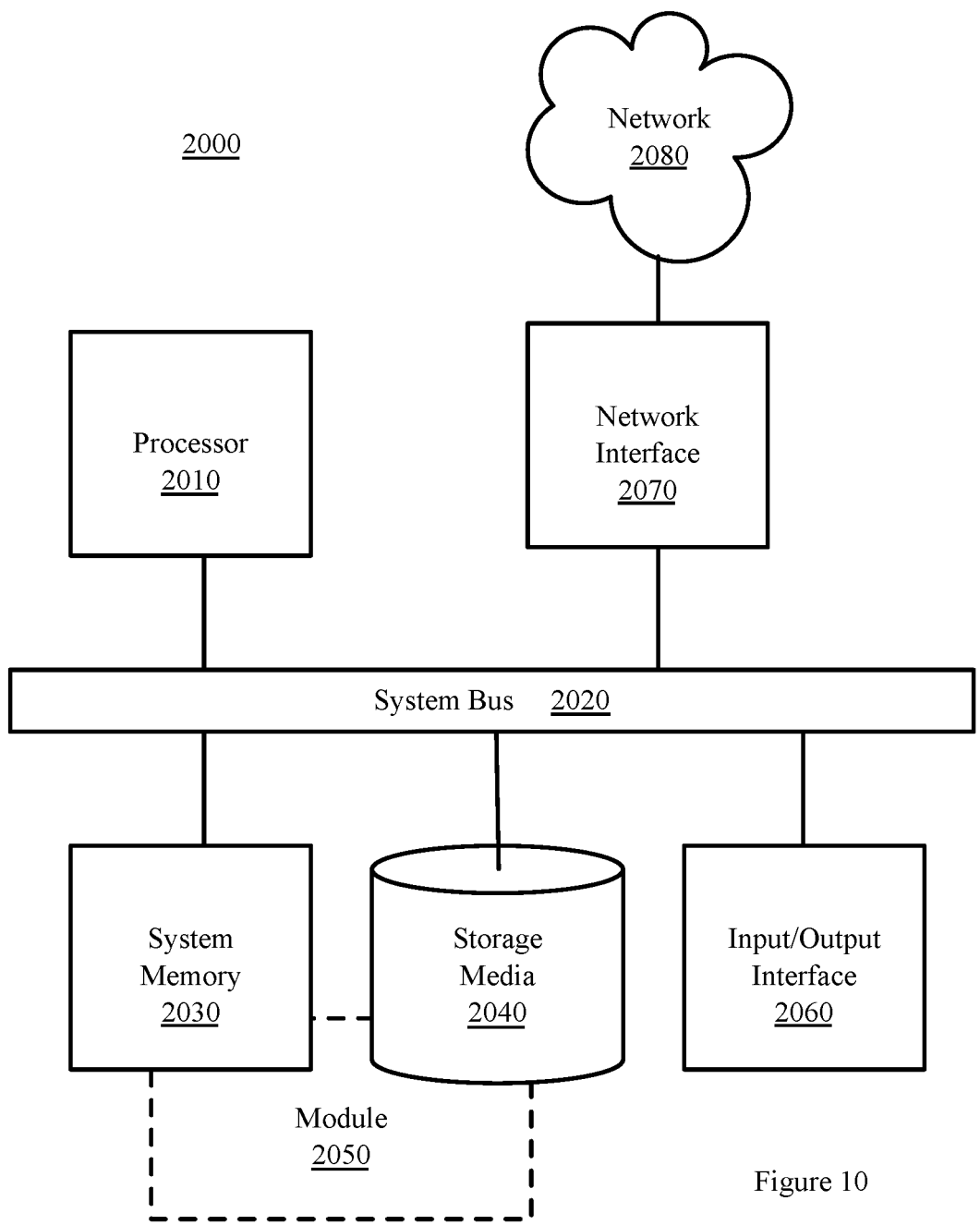
FIG. 10 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 10. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 10. The computing machines discussed herein may communicate with one another, as well as with other computing machines or communication systems over one or more networks, such as network 160. The network 160 may include any type of data or communications network, including any of the network technology discussed with respect to FIG. 10.

Example Processes

The example methods illustrated in FIGS. 2-9 are described hereinafter with respect to the components of the example operating environment 100. The example methods of FIGS. 2-9 may also be performed with other systems and in other environments.

Figure 2:
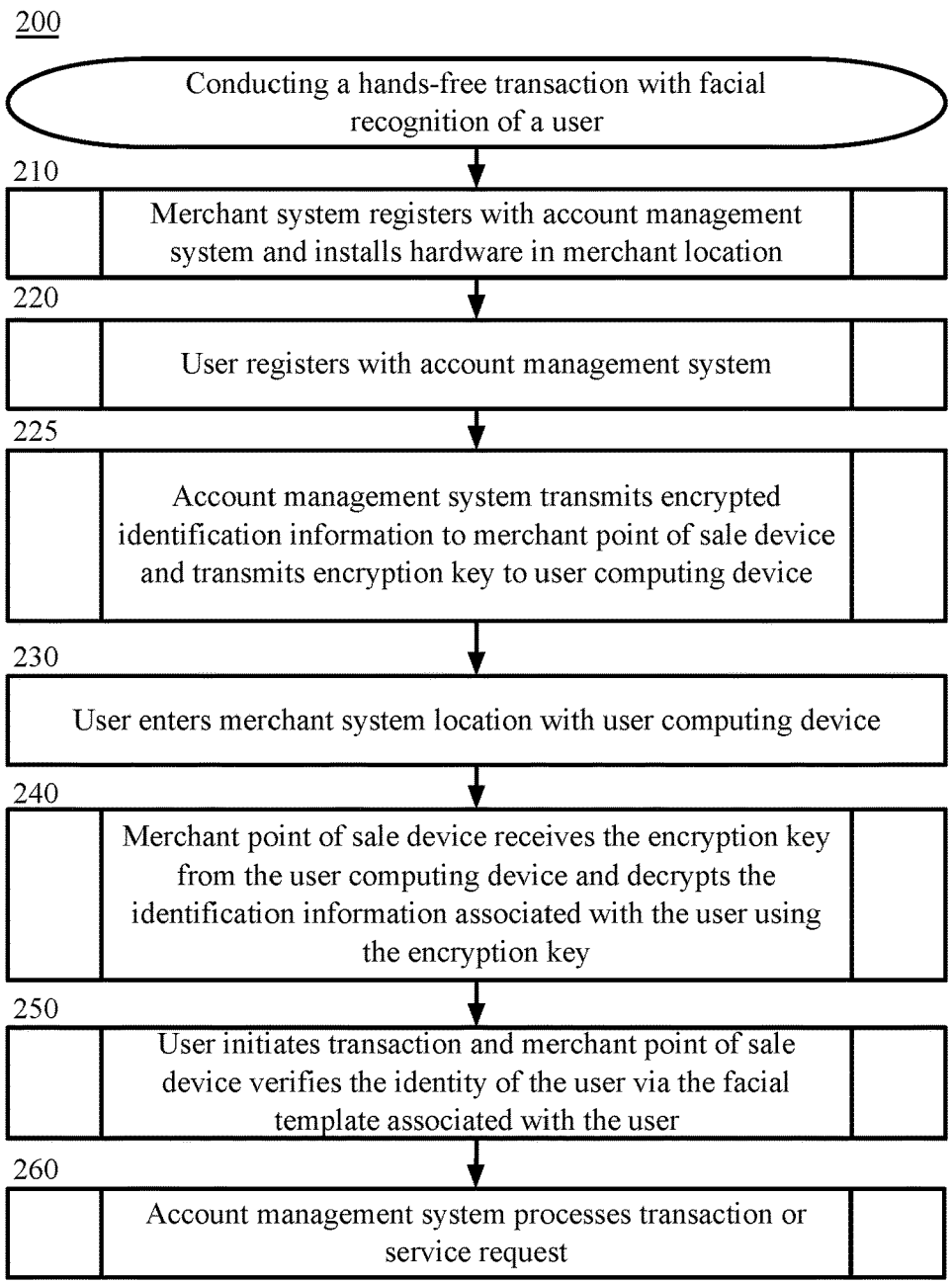
FIG. 2 is a block flow diagram depicting a method for communicating encrypted user identification data associated with users anticipated to visit a location to a computing device at the location and to communicate encryption keys to user computing devices associated with the users so that the users may be identified in service requests initiated at the computing device, in accordance with certain example embodiments.

FIG. 2 is a block diagram depicting a method 200 for communicating encrypted user 101 identification data associated with users 101 anticipated to visit a location to a merchant point of sale device 130 at the location and to communicate encryption keys to user computing devices 110 associated with the users 101 so that the users 101 may be identified in service requests initiated at the merchant point of sale device 130, in accordance with certain example embodiments. The method 200 is described with reference to the components illustrated in FIG. 1.

In block 210, the merchant system registers with the account management system 160 and installs hardware in a merchant location. The method 210 for registering, by a merchant system, with a account management system 150 and installing hardware at a merchant system location is described in more detail hereinafter with reference to the method described in FIG. 3.

Figure 3:
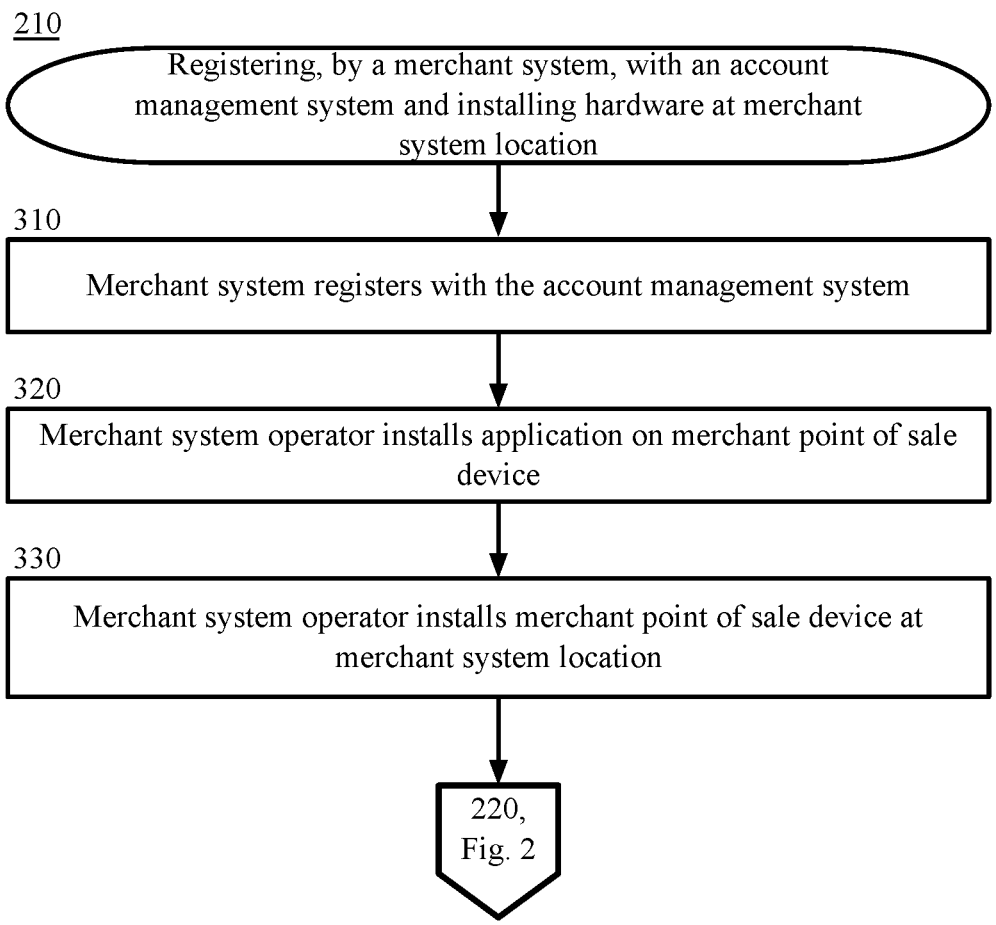
FIG. 3 is a block flow diagram depicting a method for registering, by a merchant system, with an account management system and installing hardware at a merchant system location, in accordance with certain example embodiments.

FIG. 3 is a block diagram depicting a method 210 for registering, by a merchant system, with an account management system 150 and installing hardware at a merchant system location, in accordance with certain example embodiments. The method 210 is described with reference to the components illustrated in FIG. 1. In other example embodiments, a service provider system (not depicted) registers with the account management system 150 and installs hardware in a service provider system location. The method for registering, by the service provider system, with the account management system 150 and installing hardware at the service provider system location may be performed similarly to the method described in FIG. 3.

In the example embodiments described herein, the merchant system does not need to install hardware at the example merchant system location or service provider system location in any particular order. The method 210 describes one example method of installing hardware at the merchant location. However, the merchant system or other system installing the merchant hardware does not need to install the merchant POS device 130 and/or the merchant beacon device 120 in the order described herein.

In block 310, a merchant system registers with the account management system 150. In an example embodiment, an agent of the merchant system accesses an account management system 150 website and registers for a merchant account with the account management system 150 via the website. In an example embodiment, the merchant system adds payment account information associated with a merchant account to the merchant account managed by the account management system 150. In an example embodiment, the merchant system comprises one or more merchant system locations. For example, the merchant system may comprise one or more physical store locations. An example merchant location comprises one or more merchant point of sale ("POS") devices 130. In an example embodiment, one or more merchant POS device operators 102 operate the one or more merchant POS devices 130 at the merchant system location.

In block 320, a merchant system operator installs the application 133 on the merchant point of sale device 130. In another example embodiment, the merchant system operator purchases a merchant POS device 130 from the account management system 160 with the application 133 preinstalled on the merchant POS device 130. In an example embodiment, the merchant POS device 130 is able to communicate with the account management system 150 over a network 160. In an example embodiment, the merchant POS device 130 communicates with the account management system 150 via the application 133. For example, the merchant POS device 130 may be able to transmit transaction details to the account management system 150 via the application 133 over the network 150 to enable the account management system 150 to process a payment transaction. In another example, the merchant POS device 130 may be able to receive a receipt from the account management system 150 that notifies a merchant POS device operator 102 as to whether a transaction was successful or not.

In block 330, a merchant system operator installs a merchant POS device 130 at the merchant system location. In an example embodiment, a merchant camera device and/or a merchant beacon device 120 are installed in proximity to the merchant POS device 130 or the merchant POS device 130 comprises the camera component 137 and/or the merchant beacon device 120. For example, the merchant camera device and the merchant beacon device 120 are installed within a 5-foot physical proximity to the particular merchant POS device 130. In an example, one or both of the merchant beacon device 120 and/or the merchant camera device may be components of the merchant POS device 130. In another example embodiment, a merchant camera device and a merchant beacon device 120 are installed in proximity to two or more particular merchant POS devices 130. For example, the merchant camera device and the merchant beacon device 120 are installed within a 5-foot physical proximity to the two or more particular merchant POS devices 130. In an example embodiment, the merchant camera device is oriented to be able to capture video and/or images of a face of a user 101 standing in front of one or more merchant POS devices 130 during the process of checkout. In an example embodiment, the merchant system installs a merchant camera device that is oriented to capture video and/or images of the face of a user standing in front of a particular merchant POS device 130. In another example embodiment, the merchant system installs a merchant camera device that is oriented to capture video and/or images of the faces of one or more users 101 standing within a proximity of a particular plurality of merchant POS devices 130 within a range of a field of vision of the camera of the merchant camera device.

In certain example embodiments, the merchant POS device 130 operator installs a merchant beacon device 120 at the merchant location. In an example embodiment, the merchant beacon device 120 receives a beacon identifier code from the account management system 150. In an example embodiment, the merchant system receives a beacon identifier code from the account management system 150 and installs, associates, or otherwise saves the beacon identifier code on the merchant beacon device 120. In an example embodiment, a merchant system operator installs the merchant beacon device 120 in proximity to a merchant POS device 130. In an example embodiment, the proximity is a predefined measure of distance (for example, feet, inches, meters, or other measurement of distance) from the merchant POS device 130. In an example embodiment, the merchant system operator installs a plurality of merchant beacon devices 120, each merchant beacon device 120 in proximity to one or more associated merchant POS devices 130. In an example embodiment, the merchant beacon device 120 is able to broadcast a merchant beacon identifier code over a wireless medium, wherein one or more user computing devices 110 located within a threshold proximity to the merchant beacon device 120 are able to receive the merchant beacon identifier code over the wireless medium. For example, the one or more user computing devices 110 periodically scan for wireless network device identifiers within a network proximity to the user computing device 110 and receive the merchant beacon identifier code broadcast from the merchant beacon device 120 via the scan for wireless device identifiers. In another example embodiment, the merchant beacon device 120 is able to establish a local network 160 connection to one or more user computing devices 110 located within a threshold proximity to the merchant beacon device 120, and the merchant beacon device 120 transmits the merchant beacon identifier code to the one or more user computing devices 110 over the established local network 160 connection. In this example embodiment, the threshold proximity depends on the network 160 communication protocol utilized by the merchant beacon device 120. For example, the user computing device 110 scans for wireless network devices at the merchant system location and detects the merchant beacon device 120. In this example, the user computing device 110 transmits a request to the merchant beacon device 120 to establish a network connection between the user computing device 110 and the merchant beacon device 120. In this example, the merchant beacon device 120 receives the request and transmits a response to the user computing device 110 and the local network 160 connection is established. In another example, the merchant beacon device 120 transmits a request to the user computing device 110 to establish a network 160 connection, the user computing device 110 receives the request, the user computing device 110 transmits a response back to the merchant beacon device 120, and the local network 160 connection is established. In an example embodiment, the merchant beacon device 120 broadcasts the beacon identifier code via wireless communication at the location of the merchant system. For example, the merchant beacon device 120 may broadcast, emit, or otherwise transmit data comprising the beacon identifier code via Wi-Fi, Bluetooth, Bluetooth low energy ("BLE"), NFC, or other communication protocol to one or more user computing devices 110 located within a threshold proximity to the merchant beacon device 120. In some example embodiments, the merchant beacon device 120, at a time before transmitting the merchant beacon identifier code, is operable to establish a network 160 connection between the merchant beacon device 120 and one or more user computing devices 110 located at the merchant system location within a threshold proximity to the merchant beacon device 120. In this example, the merchant beacon device 120 establishes the network 160 connection between the merchant beacon device 120 and the one or more user computing devices 110 and then transmits the merchant beacon device 120 identifier code to the one or more user computing devices 110 via the established network 170 connection.

In certain example embodiments, one or both of the merchant camera device and the merchant beacon device 120 are components of the merchant POS device 130 or are wirelessly or physically connected to the merchant POS device 130 and controlled by one or more processors of the merchant POS device 130. In certain example embodiments, certain functions described herein as performed by the merchant camera device and/or the merchant beacon device 120 may also be performed by the merchant POS device 130.

From block 360, the method 210 proceeds to block 220 of FIG. 2.

Returning to FIG. 2, in block 220, the user 101 registers with the account management system 150. The method for registering, by a user 101, for an account with an account management system 150 and creating a user 101 account is described in more detail hereinafter with reference to the method 220 described in FIG. 4.

Figure 4:
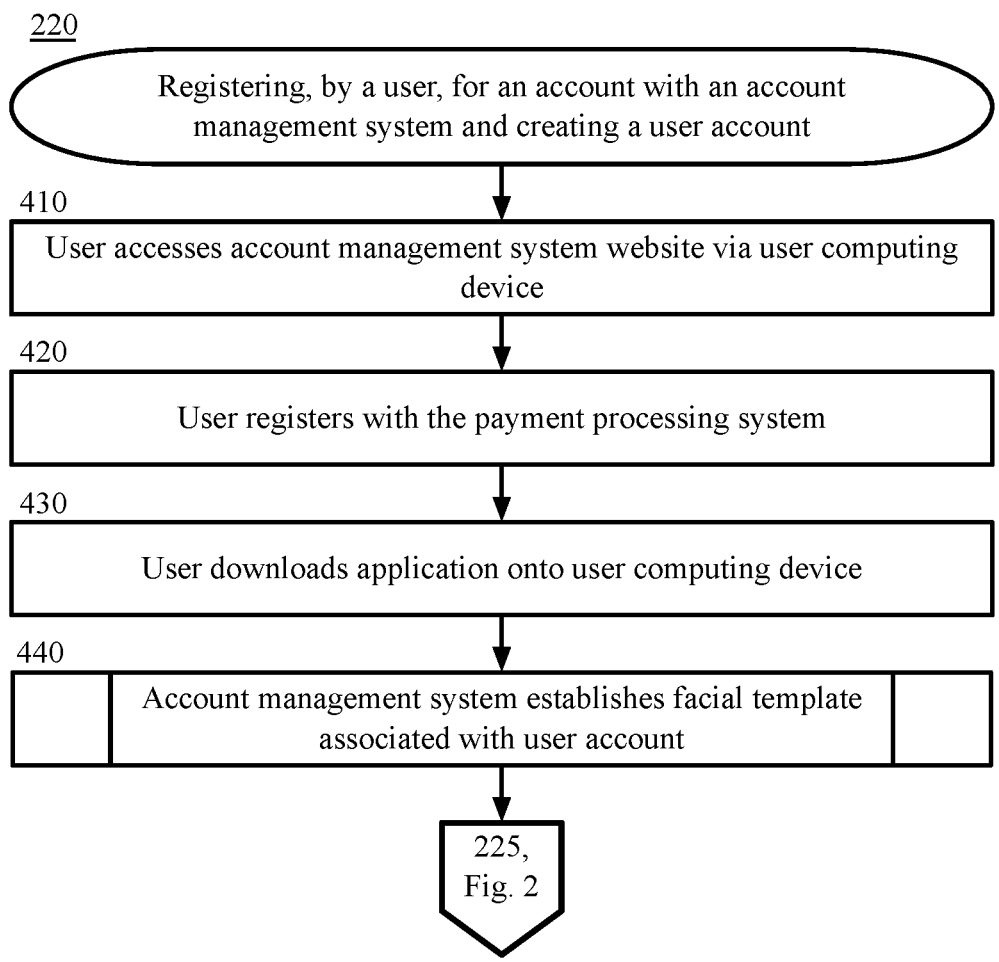
FIG. 4 is a block flow diagram depicting a method for registering, by a user, for an account with an account management system and creating a user account, in accordance with certain example embodiments.

FIG. 4 is a block diagram depicting a method 220 for registering, by a user 101, for an account with an account management system 150 and creating a user 101 account, in accordance with certain example embodiments. The method 220 is described with reference to the components illustrated in FIG. 1.

In block 410, the user 101 accesses the account management system 150 website. For example, the user 101 accesses the account management system 150 website via the web browser 118 of the user computing device 110. In another example, the user 101 may otherwise contact the account management system 150 to register for a user 101 account.

In block 420, the user 101 registers with the account management system 150. The user 101 may obtain a user account number, receive the appropriate applications and software to install on the user computing device 110, request authorization to participate in hands-free transaction processing, or perform any action required by the account management system 150. The user 101 may utilize the functions of the user computing device 110, such as the user interface 115 and the web browser 118, to register and configure a user 101 account. In an example embodiment, the user 101 may enter payment account information associated with one or more user 101 accounts, for example, one or more credit accounts, one or more bank accounts, one or more stored value accounts, and/or other appropriate accounts into the user 101 account maintained by the account management system 150. The user 101 may also enter contact information comprising one or more addresses, telephone numbers, email addresses, locations, or other information identifying contact information of the user 101. In another example, the user 101 may enter demographic information of the user 101, for example, an age of the user 101 or a birthdate of the user 101. In yet another example, the user 101 may enter one or more club memberships or program memberships of the user 101. For example, the user 101 may enter an account number associated with a merchant system loyalty program membership.

In block 430, the user 101 downloads the application 113 onto the user computing device 110. In an example embodiment, the application 113 operating on the user computing device 110 is able to communicate with the account management system 150 over the network 160. In an example embodiment, the user 101 may configure user 101 account settings or add, delete, or edit payment account information via the application 113. In an example embodiment, the user 101 may select an option to enable or disable the permission of the account management system 150 to process hands free transactions. For example, a hands free transaction comprises a transaction wherein the user 101 does not need to interact with the user computing device 110 or requires minimal user 101 interaction with the user computing device 110 to initiate a transaction with the merchant system at the merchant system location.

In block 440, the account management system 150 establishes a facial template associated with the user 101 account. The method for establishing a facial template associated with a user 101 account is described in more detail hereinafter with reference to the method 440 described in FIG. 5.

Figure 5:
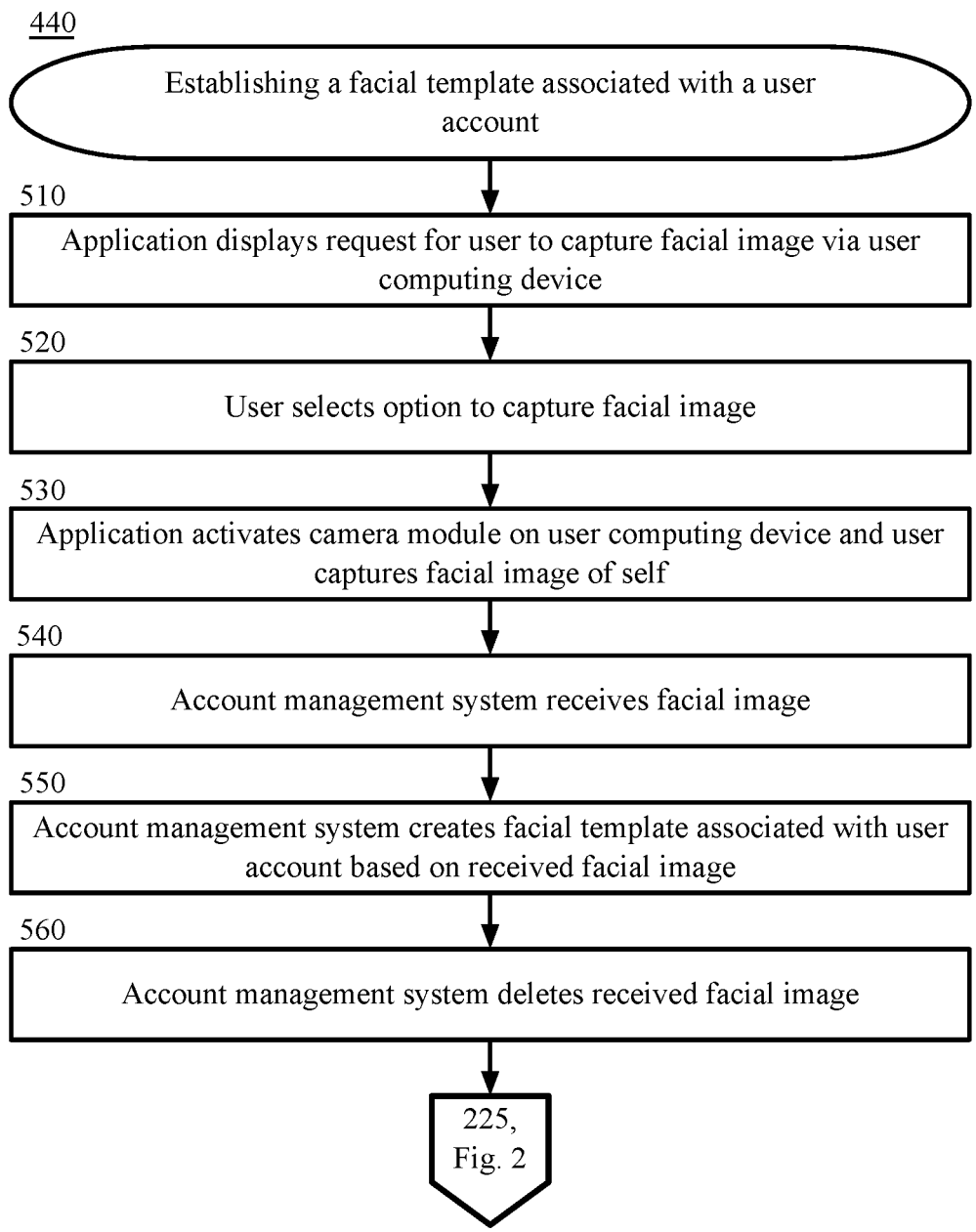
FIG. 5 is a block flow diagram depicting a method for establishing a facial template associated with a user account, in accordance with certain example embodiments.

FIG. 5 is a block diagram depicting a method 440 for establishing a facial template associated with a user 101 account, in accordance with certain example embodiments. The method 440 is described with reference to the components illustrated in FIG. 1.

In block 510, the application 113 displays a request for the user 101 to capture a facial image via the user computing device 110. In an example embodiment, the application 113 displays the request via the user interface 115. In an example, the user interface 115 may display a request that reads, "to enable hands free transactions, we need an image of your face. Would you like submit a facial image now?" In this example, the user 101 may select an option to take a current picture or may otherwise select a picture stored on the user computing device 110.

In block 520, the user 101 selects an option to capture a facial image. For example, the user 101 actuates an object on the user interface 115 of the user computing device 110 that reads, "yes, I would like to take a picture now."

In block 530, the application 113 activates the camera component 117 on the user computing device 110 and the user 101 captures a facial image of himself In an example embodiment, the user computing device user interface 115 may display a live camera feed of the user 101 to aid the user 101 in aligning the user's 101 face to take the facial image. In an example embodiment, the application 113 may display on the user computing device 110 a box or other perimeter on the user interface 115 within which the user 101 should align his face to take a picture of a required size predetermined by the account management system 150. In an example embodiment, the user 101 may actuate an object on the user interface 115 to capture the image. In this example embodiment, in response to the user actuating the object on the user interface 115, the camera component 117 receives a command from the application 113 to capture an image of the user 101. In another example embodiment, the camera component 117 receives a command from the application 113 to capture a plurality of images of the user 101 as the user 101 moves the camera around the user's 101 face. For example, each of the plurality of images of the user 101 may correspond to a particular pose of the user's 101 face. An example facial image may comprise a digital image of the face of a user 101. In an example embodiment, the account management system 150 may establish guidelines for users 101 in submitting facial images. For example, the application 113 may direct the user 101 to remove any hats, head coverings, glasses, or other objects or accessories that may occlude regions of the user's 101 face so that application 113 may receive a complete depiction of the user's 101 face.

In an example embodiment, the user computing device 110 determines if the captured facial image is a valid facial image or an invalid facial image. For example, a valid facial image complies with guidelines predetermined by the account management system 150 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In this example, the user 101 captures a subsequent facial image via the user computing device 110, and the user computing device 110 transmits the subsequent facial image to the account management system 150 via the network 160.

In block 540, the account management system 150 receives the facial image. In another example embodiment, the account management system 150 receives a plurality of facial images of the user 101. For example, the application 113 transmits the one or more facial images of the user 101 to the account management system 150 via the network 160. In an example embodiment, the account management system 160 associates the received one or more facial images with the user 101 account. For example, the account management system 160 is able to identify the user 101 account to associate with the received one or more images because the user 101 is currently logged in to the application 113 on the user computing device 110 at the time the one or more facial images are transmitted to the account management system 150. In certain example embodiments, the account management system 160 determines if the received facial image is a valid facial image or an invalid facial image. For example, a valid facial image complies with all guidelines predetermined by the account management system 150 and an invalid facial image does not comply with one or more of the guidelines. For example, if a user 101 submits a facial image that comprises incorrect dimensions, if part or all of the user's 101 face is occluded, or if the image is too dark or too bright, the account management system 150 rejects the invalid facial image and transmits a request to the user computing device 110 directing the user 101 to capture a subsequent facial image to transmit to the account management system 150. In this example, the user computing device 110 receives and displays the request, the user 101 captures a subsequent facial image via the user computing device 110, and the user computing device 110 transmits the subsequent facial image to the account management system 150 via the network 160.

In block 550, the account management system 150 creates a facial template associated with the user 101 account based on the received facial image. In another example embodiment, the account management system 150 generates a corresponding facial template for each of a plurality of received facial images associated with the user 101 account. In an example, the facial template is of a predetermined size, for example, a 128-byte facial template. In an example, the account management system 150 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network. In an example embodiment, the account management system 150 stores the generated facial template associated with the user 101 in a data storage unit 156 associated with the account management system 150. For example, the account management system 150 database may comprise a table or other means by which it correlates each user 101 account identifier with an associated facial template of the user 101.

In another example embodiment, after the user computing device 110 captures one or more facial images of the user 101, the user computing device 110 generates one or more facial templates corresponding to one or more of the one or more captured facial images of the user 101. In this example embodiment, the user computing device 110 transmits the one or more generated facial templates to the account management system 150 over the network 160.

In block 560, the account management system 150 deletes the received facial image. For example, the account management system 150 only uses a facial template comprising a computer code representation of the facial image of the user 101. In another example, the account management system 150 saves the received facial image for future processing. For example, the account management system 150, at a later time, updates a facial template generation algorithm and generates an updated facial template corresponding to the saved facial image.

In another example embodiment, the account management system 150 establishes an audio template associated with the user 101 account. For example, the application 113 displays a request for the user 101 to capture an audio recording of the user's 101 voice via the user computing device 110. In an example embodiment, the application 113 displays the request via the user interface 115. In an example, the user interface 115 may display a request that reads, "to enable hands free transactions, we need recording of your voice. Would you like submit a audio recording now?" In this example, the user 101 may select an option to submit a live audio recording or may otherwise select a pre-recorded audio recording of the user 101 stored on the user computing device 110. In an example embodiment, the user 101 selects an option to capture an audio recording. For example, the user 101 actuates an object on the user interface 115 that reads, "yes, I would like to submit a audio recording now." The application 113 may activate an audio component (not depicted) on the user computing device 110 and the user 101 captures an audio of the user's 101 voice. In an example embodiment, the user computing device user interface 115 may display guidelines received from the account management system 160 to aid the user 101 in submitting an audio recording. For example, the application 113 may display directions for the user 101 to record the user's 101 voice saying the user's 101 name or a sample dictation. In another example, the application 113 directs the user 101 to capture an audio recording to establish a voice password that can be used in hands-free transactions of the user 101. In an example embodiment, the user 101 may actuate an object on the user interface 115 to capture or record a live audio recording. In this example embodiment, in response to the user actuating the object on the user interface 115, the audio component receives a command from the application 113 to capture an audio recording of the user 101. In an example embodiment, the account management system 150 may establish guidelines for users 101 in submitting audio recordings. For example, the application 113 may direct the user 101 to submit an audio recording no longer than a predefined maximum length of duration. For example, the audio recording must be no longer than five seconds. In another example, the application 113 may direct the user 101 submit an audio recording lasting a predefined length of time, for example, an audio recording lasting five seconds. In an example embodiment, after the user 101 initiates an audio recording by actuating an object of the user interface 115, the application 113 transmits a command to the audio component to stop recording the user's 101 voice after the predefined length of time or predefined maximum length of time has expired.

In an example embodiment, the account management system 150 receives the audio recording of the voice of the user 101. For example, the application 113 or audio component transmits the audio recording to the account management system 150 over the network 160. In another example, the application 113 retrieves an audio recording selected by the user 101 and saved in the data storage unit 116 and transmits the retrieved audio recording to the account management system 150 over the network 160. In an example embodiment, the account management system 160 creates an audio template associated with the user's 101 voice based on the received audio of the voice of the user. In an example, the audio template is of a predetermined size. In an example, the account management system 160 generates an audio template comprising a computer code representation of the user's 101 audio recording. For example, the audio template may describe key features of the audio recording of the user 101, such as the intonation of the user's 101 voice or other acoustic features of the user's 101 voice such as volume or pitch. In an example embodiment, the account management system 150 stores the generated audio template associated with the user 101 in a data storage unit 156 associated with the account management system 150. For example, the account management system 150 database may comprise a table or other means by which it correlates each user 101 account identifier with an associated audio template of the user 101. In an example embodiment, the account management system 150 deletes the received audio of the voice of the user 101. In an example embodiment, the account management system 150 deletes the received audio recording of the user 101 to protect the privacy of the user 101. For example, the account management system 150 only uses a audio template comprising a computer code representation of the audio recording of the user 101.

From block 560, the method 440 proceeds to block 225 in FIG. 2.

Returning to FIG. 2, in block 225, the account management system 150 transmits encrypted identification information to the merchant POS device 130 and transmits an encryption key to the user computing device 110. The method for transmitting, by an account management system 150, encrypted identification information to a merchant point of sale device 130 and a corresponding cryptographic key to a user computing device 110 is described in more detail hereinafter with reference to the method 225 described in FIG. 6.

FIG. 6 is a block diagram depicting a method 225 for transmitting, by an account management system 150, encrypted identification information to a merchant point of sale device 130 and a corresponding cryptographic key to a user computing device 110, in accordance with certain example embodiments. The method 225 is described with reference to the components illustrated in FIG. 1.

In block 610, the account management system 150 predicts that the user 101 will arrive at the merchant system location. In an example embodiment, the account management system 150 predicts that the user 101 will arrive at the merchant system location in the future based on spending habits of the user 101. For example, the account management system 150 determines that the user 101 has shopped at the location at least a threshold number of times or that the user computing device 110 associated with the user 101 was present at the merchant system location at least a threshold number of times. In this example, the account management system 150 may access transaction data listing past transactions involving the user 101 account and location data comprising location information for one or more past locations of the user computing device 110. In this example, the user 101 grants permission to the account management system 150 to log location data and transaction data via the application 113. In another example embodiment, the account management system 150 predicts that the user 101 may arrive at the merchant system location in the future based on an address, zip code, city, state, or other geographic information associated with the user 101 account. For example, the user 101 provides the geographical information to the account management system 150 when establishing the user 101 account. In this example embodiment, the account management system 150 may predict that the user 101 may arrive at the merchant system location in the future based on a distance between a location associated with the geographical information associated with the user 101 account and the location of the merchant system. In this example embodiment, if the distance is less than a threshold distance, the account management system 150 determines that the user 101 may arrive at the merchant system location in the future. For example, it may be more likely that the user 101 will visit a merchant system location that is within a threshold distance from the user's 101 principal address. One or more operators of the account management system 150 may determine appropriate thresholds for the example embodiments described herein. In an example embodiment, the account management system 150 predicts that the user 101 will arrive at one or more of multiple merchant system locations in the future based on transaction data and/or location data of the user 101.

In block 620, the account management system 150 generates a cryptographic key and transmits the cryptographic key to the user computing device 110. In an example, the cryptographic key comprises a series of alphabetic characters, numeric characters, symbolic characters, or other information that the merchant POS device 130 may use to decrypt encrypted information. In another example, the cryptographic key comprises one or more algorithms used to derive a subsequent cryptographic key that the merchant POS device 130 may use to decrypt encrypted information. Encrypted information may comprise encrypted identification information associated with the user 101. In an example embodiment, the account management system 150 transmits the generated cryptographic key to the user computing device 110 via the network 160. In an example embodiment, the account management system 150 communicates with the application 113 on the user computing device 110 or otherwise communicates with the user computing device 110 to transmit the cryptographic key to the user computing device 110 over the network 160. In an example embodiment, the account management system 150 communicates, to the user computing device 110 over the network 160, location data corresponding to the merchant system location at which a merchant POS device 130 to which the account management system 150 transmits encrypted data that is able to be decrypted via the cryptographic key is located. In another example embodiment, the account management system 150 communicates, to the user computing device 110 over the network 160, location data corresponding to multiple merchant system locations at which respective merchant POS devices 130 to which the account management system 150 transmits encrypted data that is able to be decrypted via the cryptographic key are located.

In block 630, the user computing device 110 receives the cryptographic key. In an example embodiment, the application 113 on the user computing device 110 communicates with the account management system 150 or the user computing device 110 otherwise communicates with the account management system 150 to receive the cryptographic key over the network 160. In an example embodiment, the user computing device 110 receives location data associated with the merchant system location along with the cryptographic key. In an example embodiment, the application 113 stores the received cryptographic key and the received location data in the data storage device 116 or the user computing device 110 otherwise stores the received cryptographic key and received location data in the data storage device 116. In an example embodiment, the user computing device 110 receives, via the network 160 from the account management system 150, multiple cryptographic keys corresponding to two or more merchant system locations and location data corresponding to the two or more merchant system locations.

In block 640, the account management system 150 encrypts identification information associated with the user 101 account that is able to be decrypted using the encryption key. In an example embodiment, the identification information comprises the facial template associated with the user 101 account. As previously discussed, the account management system 150 may create a facial template associated with the user 101 account based on a received facial image. The facial template may be of a predetermined size, for example, a 128-byte facial template and may comprise a computer code representation of the received digital facial image. The facial template may describe key features of the facial image of the user 101, such as shape, color, line, value, space, form, texture, or other useful or relevant feature of the image or of particular regions of the image. In an example, the facial template is generated by processing the facial image through a convolutional neural network. The identification may include other identification information, for example, a password, a challenge and response, or other data configured by a user 101. For example, the user 101 may configure or input the identification information to the user 101 account via the payment application 113.

In an example embodiment, the account management system 150 stores the facial template associated with the user 101 or other identification information associated with the user 101 account in a data storage unit 156 associated with the account management system 150. For example, the account management system 150 database may comprise a table or other means by which it correlates each user 101 account identifier with an associated facial template of the user 101 or associated other identification information of the user 101. In an example embodiment, the account management system 150 extracts the identification information associated with the user 101 account in response to determining that the user 101 may visit the merchant system location in the future. For example, the account management system 150 accesses the database comprising a table or other means that correlates user 101 account identifiers with associated facial templates of user 101 accounts associated with the user 101 account identifiers and extracts the identification information. In an example embodiment, the account management system 150 encrypts the identification information such that a merchant POS device 130 at the merchant location may decrypt the encrypted identification information using the cryptographic key transmitted to the user computing device 110.

In block 650, the account management system 150 transmits the encrypted identification information of the user 101 to the merchant POS device 130. In an example embodiment, the account management system 150 determines a merchant POS device 130 identifier associated with a merchant POS device 130 at the merchant location at which the account management system 150 determined that the user 101 may visit in the future. For example, the account management system 150 comprises a table or other data structure that associates merchant POS device 130 identifiers with merchant system locations. In an example embodiment, the merchant POS device 130 identifier may comprise a media access control ("MAC") identifier or other hardware identifier of the merchant POS device 130. In an example embodiment, in response to determining that the user 101 may visit the merchant system location in the future, the account management system 150 accesses the table or other data structure and determines the hardware identifier of the merchant POS device 130 associated with the merchant system location. In an example embodiment, the account management system 150 transmits the encrypted identification information to the merchant POS device 130 having the corresponding hardware identifier via the network 160. In an example embodiment, the merchant POS device 130 receives the encrypted identification information from the account management system 150 via the network 150 and may store the received encrypted identification information in the data storage unit 156.

In certain example embodiments described herein, the account management system 150 generates the cryptographic key at a time before encrypting the identification information such that a merchant POS device 130, or multiple merchant POS devices 130, may decrypt the encrypted identification information using the generated cryptographic key. However, in other example embodiments, the account management system 150 encrypts the identification information at a time before generating the cryptographic key usable by the merchant POS device 130 to decrypt the encrypted cryptographic information. In an example embodiment, the account management system 150 transmits the cryptographic key to the user computing device 110 at a time before transmitting the encrypted identification information to the merchant POS device 130. In another example embodiment, the account management system 150 transmits the cryptographic key to the user computing device 110 at a time after transmitting the encrypted identification information to the merchant POS device 130. In yet another example embodiment, the account management system 150 transmits the cryptographic key to the user computing device 110 at the same time that the account management system 150 transmits the encrypted identification information to the merchant POS device 130 via the network 160.

In an example embodiment, the account management system 150, in response to determining that the user 101 may visit the merchant system location in the future, extracts payment account information associated with one or more payment accounts associated with the user 101 account and transmits the payment account information to the merchant POS device 130 via the network 160 along with the encrypted identification information. In this example embodiment, the account management system 150 encrypts the payment account information using the cryptographic key prior to transmitting the payment account information to the merchant POS device 130 along with the encrypted identification information. In another example embodiment, the encrypted identification information comprises the payment account information.

In block 660, the merchant POS device 130 receives the encrypted identification information of the user 101. For example, the merchant POS device 130 receives the encrypted identification information from the merchant POS device 130 via the network 160. In an example embodiment, the merchant POS device 130 is unable to read, recognize, or otherwise understand the received encrypted identification information without decrypting the received encrypted identification information using a cryptographic key received from the user computing device 110.

From block 660, the method 225 proceeds to block 230 of FIG. 2.

Returning to FIG. 2, in block 230, the user 101 enters the merchant system location with the user computing device 110.

In block 240, the merchant POS device 130 receives the encryption key from the user computing device and decrypts the identification information associated with the user 101 using the encryption key. The method for receiving, by a merchant POS device 130, an encryption key from a user computing device 110 and decrypting identification information associated with a user 101 using the encryption key is described in more detail hereinafter with reference to the method 240 described in FIG. 7.

FIG. 7 is a block diagram depicting a method 240 for receiving, by a merchant POS device 130, an encryption key from a user computing device 110 and decrypting identification information associated with a user 101 using the encryption key, in accordance with certain example embodiments. The method 240 is described with reference to the components illustrated in FIG. 1.

In block 710, the user 101 enters the merchant system location with the user computing device 110 and signs in to the payment application 113. In an example embodiment, the user 101 may have a username and password associated with the user 101 account maintained by the account management system 150. In an example embodiment, the user 101 opens the application 113 on the user computing device 110 and enters a username and/or password via the user interface 115 to sign in to the application 113. In an example embodiment, when the user 101 is signed in to the application 113, the application is able to communicate with the account management system 160 over the network 170 and also is able to communicate with devices within a threshold proximity from the user computing device 110 using BLE communication. In other example embodiments, instead of or in addition to using BLE communication, the user computing device 110 is able to communicate with devices within a threshold proximity of the user computing device 110 via Wi-Fi, Bluetooth, or NFC communication. In this example embodiment, when the user 101 is not signed in to the application 113, the application does not communicate with the account management system 150 even if the a network 160 connection is available. In this example embodiment, when the user 101 is not signed in to the application 113, the application 113 does not communicate with nearby devices, including the merchant POS device 130, within a threshold proximity using BLE communication or other appropriate communication protocols. In an example embodiment, the user 101 may sign out of the application 113 at any time by actuating one or more objects on the user interface 115 of the user computing device 110.

In an example embodiment, application 113 may provide options, data, configurable alerts, and other suitable features to the user 101. For example, the application 113 may comprise a listing of merchant systems and merchant locations that participate in hands free payment transactions according to one or more of the methods described herein. The listing may be updated periodically from the account management system 150. The application 113 may notify the user 101 when the user 101 is within a configured vicinity of a participating merchant system. The application 113 may provide the user 101 with options to update payment preferences. The application 113 may provide the user 101 with a listing of recent transactions. The application 113 may provide any other suitable information to the user 101.

In block 720, the user computing device 110 transmits the encryption key to the merchant POS device 130. For example, when the user 101 is signed in to the application 113, the user computing device 110 may log location data of the user computing device 110 and communicate the location data to the application 113. For example, while the user 101 is signed in to the application 113, the application 113 determines, based on current location data of the user computing device 110, the application 113 determines that the user 101 is at the merchant system location. For example, along with the cryptographic key, the user computing device 110 may also receive, from the account management system 150, a location associated with the cryptographic key that corresponds to the merchant system location. In response to determining that the user computing device 110 is at the location corresponding with the location data received from the account management system 150 with cryptographic key, the user computing device 110 broadcasts the cryptographic key via BLE communication or other appropriate communication protocols at the merchant system location. For example, the user computing device 110 may broadcast the cryptographic key via Wi-Fi, Bluetooth, or near field communication ("NFC").

In block 730, the merchant POS device 130 receives the encryption key from the user computing device 110. In an example embodiment, the merchant POS device 130 periodically or continuously listens for BLE signals or other appropriate communication signals broadcast from devices at the merchant location. In an example embodiment, the merchant POS device operator 102 may actuate a user interface 135 object on the merchant POS device 130 to enable the merchant POS device 130 to listen for BLE signals or other appropriate signals broadcast at the merchant system location. In an example embodiment, the merchant POS device 130 receives the cryptographic key broadcast by the user computing device 110 via BLE communication or other appropriate communication protocol. In another example embodiment, the merchant POS device 130 receives the cryptographic key broadcast by the user computing device 110 via Wi-fi communication, Bluetooth communication, NFC communication, or other appropriate communication protocol.

In block 740, the merchant POS device 130 decrypts the encrypted user identification information. In an example embodiment, the merchant POS device 130 accesses encrypted identification information received from the account management system 150 via the network 160. In an example embodiment, the merchant POS device 130 may have received a plurality of encrypted identification information corresponding to a plurality of user computing devices 110, including the particular user computing device 110 which transmitted the cryptographic key to the merchant POS device 130. In an example embodiment, the merchant POS device 130 attempts to decrypt received encrypted identification information via the cryptographic key received via BLE communication from the user computing device 110. In an example embodiment, the merchant POS device 130 accesses the received encrypted identification information associated with the user 101 account and decrypts the encrypted identification information using the cryptographic key.

In block 750, the merchant POS device 130 retrieves the user 101 facial template from the user identification information and adds the facial template to a current customer log. In an example embodiment, the current customer log is stored in the data storage unit 136. In an example embodiment, the current customer log comprises facial templates for user 101 accounts associated with user computing devices 110 at the merchant system location that transmitted cryptographic keys to the merchant POS device 130 enabling the merchant POS device 130 to decrypt corresponding encrypted identification information associated with each corresponding user 101 account associated each corresponding user computing device 110 received from the account management system 150 with the corresponding cryptographic keys received from the account management system 150 via the network 160. In an example embodiment, the identification information associated with the user 101 account comprises a facial template of the user 101 generated by the account management system 150. In another example embodiment, the merchant POS device 130 transmits the decrypted identification information to the account management system 150 via the network 160 along with a request for the facial template associated with the user 101 account associated with the identification information. In this example embodiment, the account management system 150 receives the identification information from the merchant POS device 130 and transmits, back to the merchant POS device 130 the facial template of the user 101 account associated with the identification information. In this example embodiment, the merchant POS device 130 receives the facial template associated with the user 101 account from the account management system 150 over the network 160.

In block 760, the merchant POS device 130 edits the current customer log as users 101 enter and leave the merchant system location. For example, in addition to the user computing device 110, other users 101 carrying corresponding other computing devices 110 may enter the merchant system location subsequent, concurrently with, or subsequently to the time at which the user 101 enters the merchant location carrying the user computing device 110 and signing in to the application 113 on the user computing device 110. In this example, these other users 101 may sign in to the application 113 on their respective user computing devices 110 and their respective user computing devices 110 may each transmit a respective cryptographic key to the merchant POS device 130 via BLE communication or other appropriate communication. In this example, the cryptographic key associated with the user computing device 110 is unique from each of the cryptographic keys transmitted by the other user computing devices 110 to the merchant POS device 130. In this example, each of the other cryptographic keys is also a unique cryptographic key such that no two cryptographic key is alike among the cryptographic key transmitted by the user computing device 110 and the respective cryptographic keys transmitted by the other user computing devices 110 to the merchant POS device 130. In an example embodiment, for each cryptographic key received from these other user computing devices 110, the merchant POS device 130 decrypts identification information received from the account management system 150 via the network 160. In this example embodiment, the merchant POS device 130, for each decrypted identification information, extracts a corresponding facial template within the decrypted identification information or requests and receives a facial template from the account management system 150 corresponding to the respective decrypted identification information.

From block 760, the method 240 proceeds to block 250 in FIG. 2.

Returning to FIG. 2, in block 250, the user 101 initiates a transaction and the merchant POS device 130 verifies the identity of the user 101 via the facial template associated with the user 101. The method for initiating, by a user 101, a hands-free transaction and verifying, by a merchant POS device 130, an identity of the user 101 is described in more detail hereinafter with reference to the method 250 described in FIG. 8.

Figure 8:
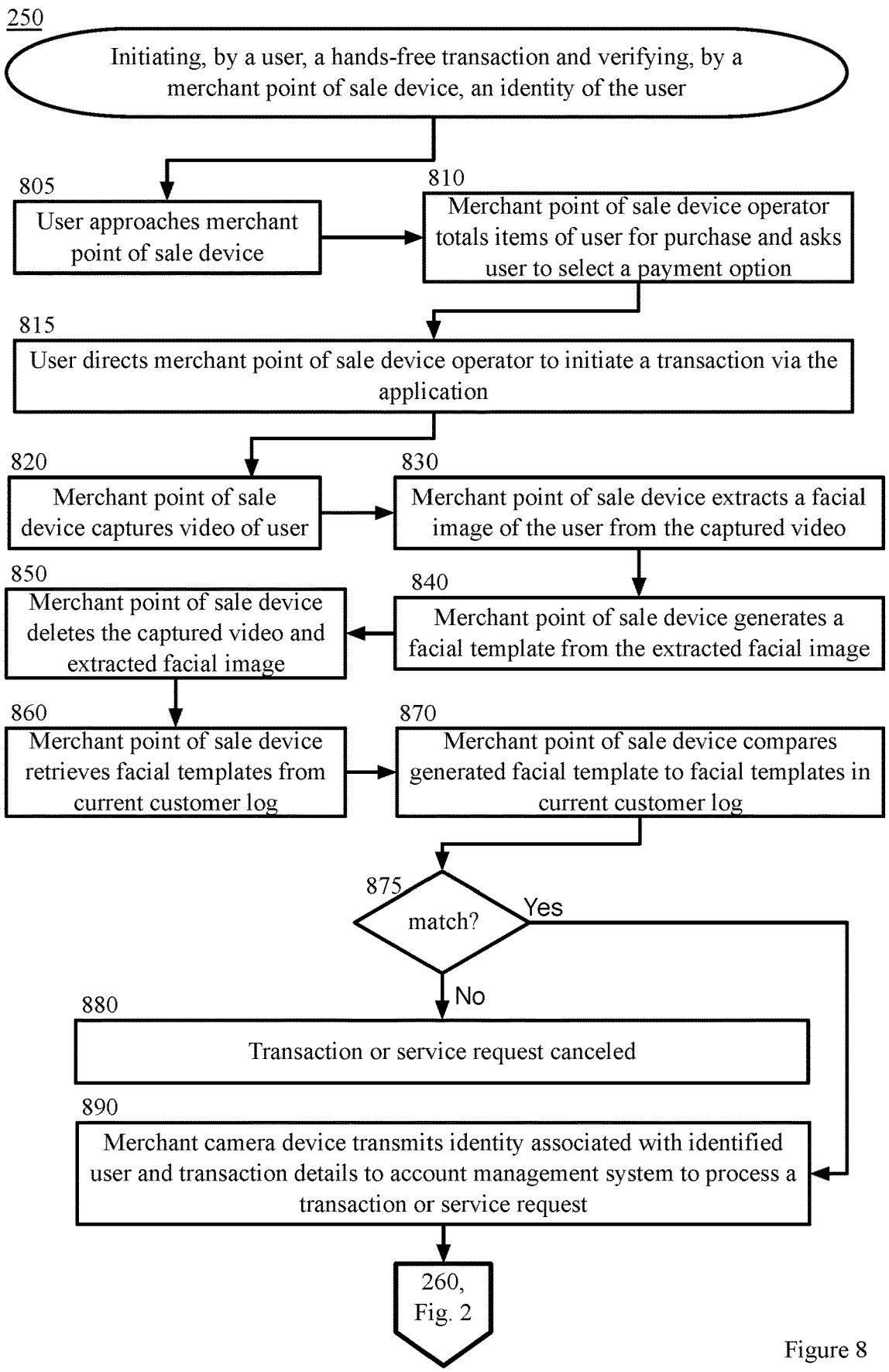
FIG. 8 is a block flow diagram depicting a method for initiating, by a user, a hands-free transaction and verifying, by a merchant point of sale device, an identity of the user, in accordance with certain example embodiments.

FIG. 8 is a block diagram depicting a method 250 for initiating, by a user 101, a hands-free transaction and verifying, by a merchant POS device 130, an identity of the user 101, in accordance with certain example embodiments. The method 250 is described with reference to the components illustrated in FIG. 1.

In block 805, a user 101 approaches the merchant POS device 130. For example, the user 101 carries the user computing device 110 within a threshold distance of the merchant POS device 130 at the merchant system location, for example, within five meters of the merchant POS device 130. In an example embodiment, the user 101 enters a location of the merchant system carrying the user computing device 110 in a pocket or a bag, in the hands of the user 101, or in any suitable manner. The location of the merchant system may be a store location, a kiosk location, or any suitable physical location of a merchant system. In another example embodiment, a merchant POS device operator 102 may be mobile and arrive at a location of the user 101. For example, the merchant system may be a restaurant and the merchant POS device operator 102 may be a delivery person possessing a portable merchant POS device 130. In an example embodiment, the user 101 approaches the merchant POS device 130 in a position such that the camera component 137 of the merchant POS device 130 is able to capture video or otherwise capture a facial image of the user 101. For example, the position of the user 101 is in the front of the camera component 137 of the merchant POS device 130. In an example embodiment, at a time prior to approaching the merchant POS device 130, the user 101 browses the merchant system location and selects one or more items to purchase. In this example embodiment, the user 101 may collect the one or more items and carry, or otherwise transport via physical basket or shopping cart, the one or more items to the merchant POS device 130. In another example embodiment, the merchant system location comprises a restaurant or other location at which the user 101 remains seated and a merchant point of sale device 130 operator carries a portable merchant point of sale device 130 to the user's 101 area.

In block 810, the merchant POS device operator 102 totals items of the user 101 for purchase and asks the user 101 to select a payment option. In an example embodiment, the merchant POS device operator 102 scans barcodes attached to the one or more items or otherwise enters descriptions and prices associated with the one or more items into the merchant POS device 130. In an example embodiment, after scanning or manually entering the items into the merchant POS device 130, the merchant POS device operator 102 actuates an object on the user interface 135 of the merchant POS device 130 to order the merchant POS device 130 to total the items. In an example embodiment, the merchant POS device 130 displays, via the user interface 135, the total to the user 101.

In block 815, the user 101 directs the merchant POS device operator 102 to initiate a transaction via the application 133. In an example, embodiment, the merchant POS device operator 102 actuates an object on the user interface 135 of the merchant POS device 130 to initiate a transaction in response to receiving instructions from the user 101. In an example embodiment, the merchant point of sale device 130 operator asks the user 101 to select a payment option. In an example embodiment, the merchant POS device 130 displays one or more payment options that the user 101 may select to use in a transaction. Example payment options may comprise payment via an application 113 associated with the account management system 150, payment by cash, payment by check, payment by credit card, payment by debit card, and/or any other means of payment that the merchant system can or is willing to accept for payment from the user 101. In an example embodiment, the one or more payment options are displayed as objects on the user interface 135 and are selectable by the merchant POS device operator 102 in response to the user 101 directing the merchant POS device 102 operator to make a selection. In an example embodiment, the user 101 directs the merchant point of sale device operator 102 to initiate a transaction via the application 113. In an example embodiment, in response to receiving a verbal request from the user 101 to select the application 113 as a payment option, the merchant POS device operator 102 actuates an object on the user interface 135 of the merchant POS device 130 corresponding to the application 113 payment option.

In block 820, the merchant POS device 130 captures video of the user 101. In an example embodiment, in response to receiving an indication of the actuation of the user interface 135 object corresponding to the application 113 payment option, the merchant camera device 140 captures photo images and/or video of the user 101. In an example embodiment, in response to receiving a request to identify the user 101, the application 133 on the merchant POS device 130 activates the camera component 137 to begin to capture photo images and/or a video of the surroundings of the camera component 137. In an example embodiment, the merchant POS device 130 camera component 137 captures a video feed of the user's 101 face. In another example embodiment, the camera component 137 continuously captures, but does not record, a video feed of its surroundings and begins to record the video feed for a threshold amount of time in response to receiving a request from the application 133 to record video. In an example embodiment, the user 101 may be moving during the period in which the camera component 137 records the video feed.

In block 830, the merchant POS device 130 extracts a facial image of the user 101 from the captured video. In an example embodiment, a processor of the merchant POS device 130 or processor of the camera component 137 extracts a facial image by determining a particular frame of the video feed and area of the instance of the video feed corresponding to the face of the user 101.

In block 840, the merchant POS device 130 generates a facial template from the extracted facial image. In an example, the facial template is of a predetermined size, for example, a 128-byte facial template. In an example, the account management system 150 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example embodiment, the merchant POS device 130 stores the generated facial template in a data storage unit 136 associated with the merchant POS device 130.

In block 850, the merchant POS device 130 deletes the captured video and the extracted facial image. For example, the merchant POS device 130 deletes the captured video and the extracted facial image in response to generating the facial template or otherwise deletes the captured video, extracted facial image, or any other data received via the camera component 137 associated with the user 101 transaction. For example, the merchant POS device 130 does not store captured images or video. In this example, facial templates generated by the merchant POS device 130 comprise computer code representations of facial images of users 101. In this example, after generating a facial template or after a threshold time has passed after capturing video or images or extracting an image from a video, the merchant POS device 130 deletes any captured or extracted video or images.

In block 860, the merchant POS device 130 retrieves facial templates form the current customer log. For example, the current customer log comprises facial templates received from the account management system 150 corresponding to all current users 101 whose associated user computing devices 110 at the merchant location and have transmitted respective cryptographic keys via BLE communication or other communication to the merchant POS device 130.

In block 870, the merchant POS device 130 compares the generated facial template to facial templates in the current customer log. In another example embodiment, the merchant POS device 130 compares the generated facial template from captured facial image to facial templates from the current customer log. Comparing the generated facial template generated from the captured facial image to facial templates from the current customer log may comprise comparing one or more individual features or components of the templates. For example, the facial template may describe key features of the facial image of the user 101, such as shape, color, line, value, space, form, texture, or other useful or relevant feature of the image or of particular regions of the image. In an example, a match comprises a complete match between the generated facial template and a facial template from the current customer log. In another example, a match comprises a similarity greater than a predefined threshold similarity between the generated facial template and a facial template from the current customer log. For example, the merchant camera device 140 determines a similarity value for each of the one or more individual features or components between the generated facial template and the facial template from the current customer log. In this example, the merchant POS device 130 may then determine an overall similarity value between the generated facial template and the facial template from the current customer log and compare the overall similarity value against the predefined threshold similarity value. If the overall similarity value is greater than or equal to the predefined threshold similarity value, the merchant POS device 130 may determine that there is a match between the generated facial template and the facial template from the current customer log. However, if the overall similarity value is less than the predefined threshold similarity value, the merchant POS device 130 may determine that there is no match between the generated facial template and the facial template from the current customer log.

In block 875, the merchant POS device 130 determines whether a particular facial template in the current customer log matches the generated facial template.

If none of the one or more facial templates in the current customer log matches the generated facial template, the method 250 proceeds to block 880.

In block 880, the transaction or service request is canceled. For example, merchant POS device 130 displays a notification to the merchant POS device operator 102 and/or the user 101, via the user interface 135, that the transaction has been canceled and/or that the user 101 cannot be identified. In another example embodiment, the merchant POS device operator 102 attempts to verify the user 101 identity via other means. For example, the merchant POS device 130 may identify the user 101 via an audio template or via a challenge and response.

In an example embodiment, in response to not being able to identify the user 101 via a corresponding facial template, the merchant POS device 130 displays a request for the user 101 to record audio. For example, the merchant system POS device 130 may display directions to the user 101 to record an audio recording. For example, the user 101 may be directed to speak the same words in the same intonation as the user 101 did when establishing an audio template with the account management system 150 at the time of setting up the user 101 account. In an example, the merchant POS device 130 records a voice input of the user 101. In an example, the merchant POS device operator 102 may actuate an object on the user interface 135 to activate an audio component to receive an audio input of the user 101. The merchant system POS device 130 records the audio input and compares the received voice input against the retrieved audio templates corresponding to users 101 from the current customer log. Comparing the generated audio template generated from the captured user 101 audio to audio templates from the current customer log may comprise comparing one or more individual features or components of the templates. For example, the audio template may describe key features of the audio of the user 101, such as pitch or volume. In an example, a match comprises a complete match between the generated audio template and an audio template from the current customer log. In another example, a match comprises a similarity greater than a predefined threshold similarity between the generated audio template and an audio template from the current customer log. In an example embodiment, the merchant POS device 130 determines whether there is a match between the received voice input and one of the retrieved audio templates from the current customer log. In an example embodiment, the merchant POS device 130 compares one or more features between the received voice input and each of the retrieved audio templates from the current customer log. In an example embodiment, if the similarity between the received voice input and a particular audio template exceeds a predefined threshold, the merchant POS device 130 determines that the received voice input matches the particular audio template. In another example embodiment, if the similarity between the received voice input and the particular audio template is less than the predefined threshold, the account management system 150 determines that the received voice input does not match the particular audio template. If an audio template from the current customer log matches the received voice input, the merchant POS device 130 identifies the user 101 as corresponding to the user 101 account identifier associated with the matching audio template of the user 101.

In another example embodiment, instead of identifying the user 101 via a facial template or an audio template, the merchant POS device 130 identifies the user 101 via a challenge and response. The merchant POS device operator 102 issues a challenge to the user 101. In an example embodiment, the merchant POS device operator 102 issues the challenge to the user 101 only when the user 101 could not be identified via facial or voice recognition. In another example embodiment, the point of sale device operator 102 issues the challenge to the user 101 as an additional security measure even if the user 101 has already been identified via facial or voice recognition. In an example, the merchant POS device operator 102 asks the user 101 for the initials or other data of the user 101. In another example, the merchant POS device operator 102 asks the user 101 for the last four digits of the phone number of the user 101. In another example, the merchant POS device operator 102 asks the user 101 for a configured password. Any suitable challenge may be issued by the merchant POS device operator 102. In an example embodiment, the response to the challenge does not provide any secure or private information. In an example, the user 101 provides a challenge response to the merchant POS device operator 102 to input into the merchant POS device 130 via the user interface 135. As described in the example challenges, the responses may be the initials of the user 101, the last four digits of the phone number of the user 101, or a configured password. Any configured challenge response may be utilized. In certain embodiments, the response may be a spoken response, a hand gesture, a keypad entry, a display of an identification card, or any suitable response. The merchant POS device operator 102 inputs the challenge response of the user 101. In an example, if the user 101 indicates that the initials of the user 101 are "AC," then the merchant POS device operator 102 inputs "AC" into the application 133 of the merchant POS device 130. In an example, the user interface 135 of the merchant POS device 130 displays a request for an entry of the response of the user 101. The merchant POS device operator 102 enters the response via a virtual or physical keyboard, voice dictation, or in any suitable manner. In an alternate example, the user 101 enters the response into the user interface 135 of the merchant POS device 130. In an example embodiment, the merchant point of sale device 130 displays potential users 101 based on the challenge response. The merchant POS device 130 displays potential users 101 based on the challenge response. A list of users 101 that are associated with the challenge response are displayed on the merchant POS device 130 to the merchant POS device operator 102. For example, if ten customers are in the vicinity of the merchant beacon device 120, then the merchant POS device 130 may have received from the account management system 150 a challenge response associated with each of the respective ten customers. When the merchant POS device 130 receives the challenge response input, only the potential users 101 that are associated with the challenge response are displayed to the merchant POS device operator 102. In another embodiment, the merchant POS device 130 presents additional challenges until there is a single matching user 101 remaining. In an example, if the merchant POS device operator 102 inputs "AC" as the initials of the user 101 associated with the transaction, then only the potential users 101 with those initials will be displayed to the merchant POS device operator 102 by the application 133. The application 133 accesses a database on the merchant POS device 130 and identifies the initials of the potential users 101 that have provided tokens. The application 133 identifies the one or more potential users 101 that have the initials "AC" and displays the identified user 101 accounts to the merchant POS device operator 102. In the example, two of the ten customers that are in the vicinity of the merchant beacon device 120 have the initials "AC." The user 101 accounts of the two customers are displayed to the merchant POS device operator 102. In certain example embodiments, all of the nearby customers who have had tokens transmitted to the merchant POS device 130 are presented to the merchant POS device operator 102 and the merchant POS device operator 102 selects the appropriate user 101 account. The application 133 may display a picture of the potential user 101 accounts that are presented to the merchant POS device operator 102. For example, each user 101 may associate a picture with a user 101 account. When the merchant POS device 130 presents the one or more potential user 101 accounts to the merchant POS device operator 102, the merchant POS device operator 102 may select the appropriate user 101 account based on the picture matching the user 101 conducting the transaction. Other identifying information may be presented instead of, or in addition to, a picture. For example, the name of the user 101 may be displayed and the merchant POS device operator 102 may identify the potential user 101 with that name. Any other suitable identifying information may be presented. The merchant POS device operator 102 selects the user 101 account for use in a transaction. After identifying the displayed picture of the user 101, the merchant POS device operator 102 may input a selection of the user 101 by actuating a user interface 135 control associated with the picture, or by inputting the selection in any suitable manner. If the picture doesn't match any of the potential users, then the merchant POS device operator 102 may cancel the transaction, notify the user 101 of the discrepancy, or perform any other suitable action.

Returning to block 875, if the merchant POS device 130 determines that a particular facial template in the current customer log matches the generated facial template, the method 250 proceeds to block 890. In an example, a match comprises a complete match between the generated facial template and a facial template from the current customer log. In another example, a match comprises a similarity greater than a predefined threshold similarity between the generated facial template and a facial template from the current customer log. For example, the merchant camera device 140 determines a similarity value for each of the one or more individual features or components between the generated facial template and the facial template from the current customer log. In this example, the merchant POS device 130 may then determine an overall similarity value between the generated facial template and the facial template from the current customer log and compare the overall similarity value against the predefined threshold similarity value. If the overall similarity value is greater than or equal to the predefined threshold similarity value, the merchant POS device 130 determines that there is a match between the generated facial template and the facial template from the current customer log.

In block 890, the merchant POS device 130 transmits an identifier associated with the identified user 101 and transaction details to the account management system 130 to process a transaction.

In other example embodiments, however, the merchant POS device 130 processes the transaction or processes the service request. For example, the merchant POS device may have received payment account information from the account management system 150 along with the identification information sufficient to process a transaction using the payment account of the user 101. In an example embodiment, the merchant POS device 130 generates a transaction authorization request comprising transaction details and the payment account information. In an example embodiment, the transaction details comprise a total amount of the transaction, one or more descriptions of items in the transaction, a date and/or time of the transaction, payment account information of the merchant system, and/or any other appropriate information associated with the transaction and necessary for an issuer system 140 associated with the payment account to determine whether to approve or deny a transaction authorization request. In an example embodiment, the merchant POS device 130 transmits the generated transaction authorization request to the issuer system 140 associated with the payment account information over the network 160. In an example embodiment, the issuer system 140 receives the transaction authorization request from the merchant POS device 130 over the network 160 and approves or denies the transaction authorization request. In an example, the issuer system 140 transmits notice of approval or denial of the transaction authorization request to the merchant POS device 130 and the merchant POS device 130 displays, prints, or otherwise outputs a receipt showing whether the transaction was approved or denied, the total amount of the transaction, and the one or more items purchased in the transaction.

From block 890, the method 250 proceeds to block 260 in FIG. 2.

Returning to FIG. 2, in block 260, the account management system processes the transaction or the service request. The method for processing a transaction or service request is described in more detail hereinafter with reference to the method 260 described in FIG. 9.

Figure 9:
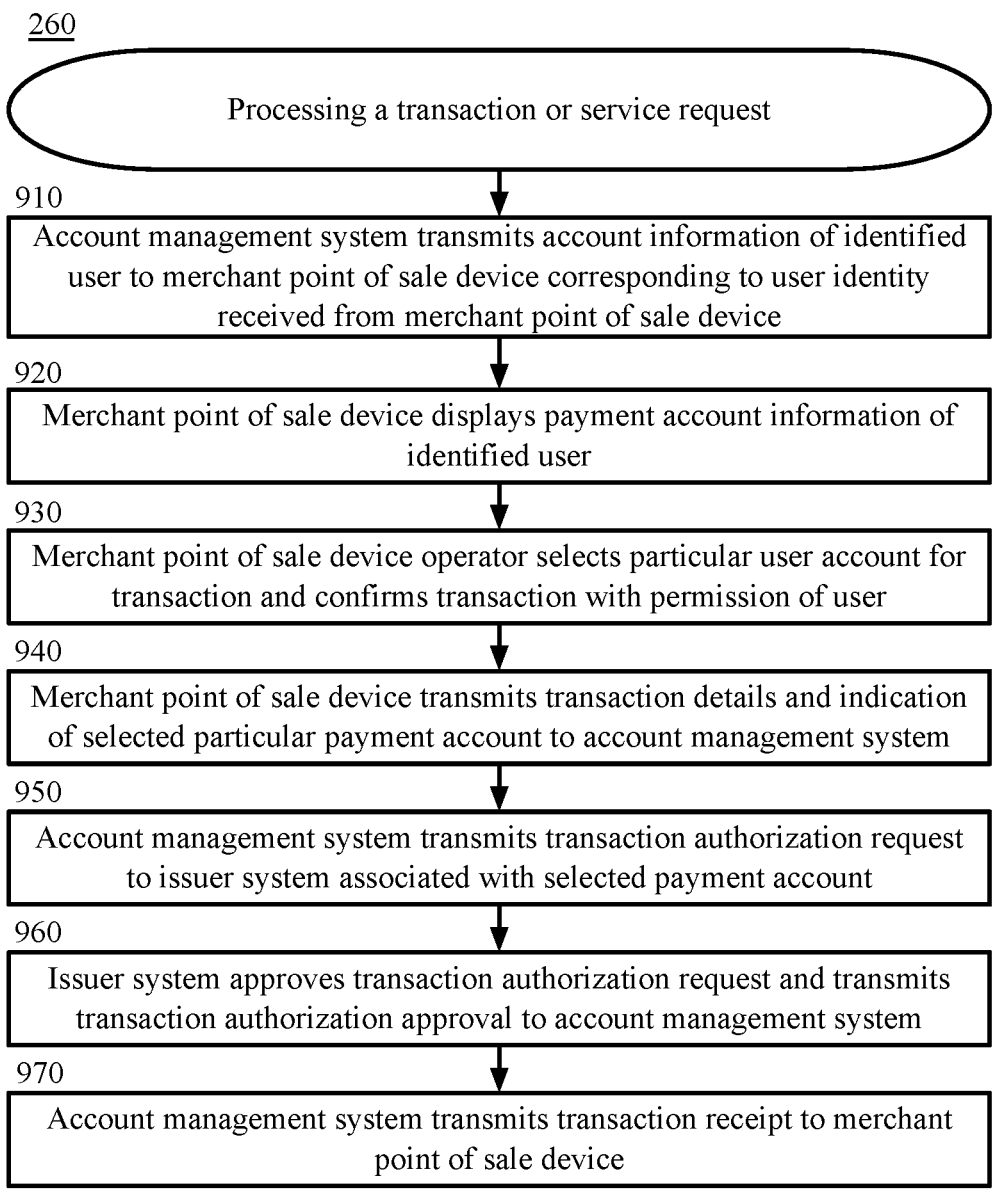
FIG. 9 is a block flow diagram depicting a method for processing a transaction or a service request, in accordance with certain example embodiments.

FIG. 9 is a block diagram depicting a method 260 for processing a transaction or a service request, in accordance with certain example embodiments. The method 260 is described with reference to the components illustrated in FIG. 1.

In block 910, the account management system 150 transmits account information of the identified user to the merchant POS device 130. For example, the user 101 account with the account management system 160 comprises payment account information associated with one or more payment accounts of the user 101. An example payment account of the user 101 comprises a credit account, bank account, stored value account, gift card, merchant system charge account, or other relevant user 101 account. In an example embodiment, the merchant POS device 130 does not receive complete payment information for one or more of the user 101 payment accounts. For example, the payment information may be obfuscated or truncated. For example, the merchant POS device 130 may only receive abbreviated payment information sufficient for a user 101 to identify a payment account via the user interface 135. In an example embodiment, account information of the user further indicates whether the user is eligible to purchase or receive one or more restricted products or service. In another example embodiment, the account information of the user further comprises demographic data, a record of membership in rewards programs or clubs, or other data associated with the user that may be relevant determining, by an operator of the merchant POS device 130, that the user is eligible or ineligible to purchase or receive a restricted product or service.

In block 920, the merchant POS device 130 displays payment account information of the user 101. In an example embodiment, the merchant POS device 130 does not display complete account information of the user 101 on the user interface 135. For example, for a credit card account, the merchant POS device user interface 135 may display only the name associated with the credit card, last four digits of the credit card number, and the expiration date.

In block 930, the merchant POS device operator 102 selects a particular user 101 account for the transaction and confirms the transaction with permission of the user 101. For example, the user 101 views the account options directly displayed on the user interface 135 or listens to the merchant POS device operator 102 read the user 101 payment account options to the user 101. In an example embodiment, the user 101 selects a payment account option to use in the transaction. For example, the user 101 decides to use a credit card account. In an example embodiment, the user 101 communicates a selection of a payment account for use in the transaction to the merchant POS device operator 102. In an example embodiment, in response to receiving the user's 101 indication of the payment account, the merchant POS device operator 102 selects the payment account indicated by the user 101 on the merchant POS device user interface 135.

In block 940, the merchant POS device 130 transmits transaction details and an indication of the selected particular payment account to the account management system 150. For example, the merchant POS device 130 transmits transaction details comprising a transaction total, an account identifier of the merchant system, and the selection of the user 101 account payment option. In an example embodiment, the account management system 150 receives the transaction details over the network 160. In an example embodiment, the account management system 150 extracts payment account information from the user 101 account corresponding to the received selection of the user 101 payment account. In an example embodiment in which a discount or offer is applied to the transaction, the transaction total that the merchant POS device 130 transmits to the account management system 150 may comprise the total amount of transaction after the discount or offer is applied to the transaction.

In block 950, the account management system 150 transmits a transaction authorization request to the issuer system 150 associated with the selected payment account. In an example embodiment, the account management system 150 generates a transaction authorization request comprising user 101 payment account information, merchant system payment account information, and a total amount of the transaction. In an example embodiment, the issuer system 140 receives the transaction authorization request from the account management system 150 via the network 160.

In block 960, the issuer system 140 approves the transaction authorization request and transmits a transaction authorization approval to the account management system 150. In an example embodiment, the issuer system 140 subtracts the user's 101 current account balance from the user's 101 credit limit associated with the user's 101 credit account. In an example embodiment, if the difference between the credit limit and the credit balance is a positive number greater than the total amount of the transaction, the issuer system 150 approves the transaction authorization. For example, the user 101 will not exceed his credit limit if the transaction were to be approved, therefore the issuer system 140 approves the transaction authorization request. In an example embodiment, the account management system 150 receives the transaction authorization approval from the issuer system 140. In another example embodiment, the account management system 150 receives a denial of the transaction authorization request in response to the issuer system 140 declining the transaction authorization request. In an example embodiment, if the issuer system 140 approves the transaction authorization request, the issuer system 140 credits the merchant system account and adds a charge to the user 101 credit account statement, bank account statement, or other appropriate statement.

In block 970, the account management system 150 transmits a transaction receipt to the merchant POS device 130. For example, the account management system 150 transmits a confirmation of the approval of the transaction or a notice of a declined transaction to the merchant POS device 130 over the network 160. In an example embodiment, the merchant POS device 130 prints a receipt comprising a summary of a successful or unsuccessful transaction via a printer device that is a component of or otherwise communicatively coupled to the merchant POS device 130. In another example embodiment, the account management system 150 may transmit a transaction receipt to the user computing device 110 to be displayed on the user computing device. In yet another example embodiment, the merchant POS device 130 transmits a transaction receipt to the user computing device 110 to be displayed on the user computing device.

Additional Example Embodiments

In certain other example embodiments, at a time before the transaction, the user computing device 110 receives a merchant beacon identifier code broadcasted by the merchant beacon device 120. The user computing device 110 recognizes a merchant beacon device 120 via wireless communication at the location of the merchant system. The user computing device 110 may be configured to search for beacons or other wireless signals. In an example embodiment, the user computing device 110 and the merchant beacon device 120 establish a Wi-Fi wireless network 170 connection. In other example embodiments, the user computing device 110 and the merchant beacon device 120 establish a Bluetooth, BLE, NFC, or other appropriate network 170 connection. Upon entering the range of the signal of the merchant beacon device 120, the user computing device 110 receives the merchant beacon identifier code. In an example, the user computing device 110 transmits the received merchant beacon identifier code and a user 101 account identifier to the account management system 150. In an example embodiment, the user computing device 110 transmits the data received in the merchant beacon identifier code, along with a user 101 account identifier, to the account management system 150 over the network 160.

In an example embodiment, the account management system 150 receives the merchant beacon identifier code and the user 101 account identifier. For example, the account management system 150 receives the merchant beacon identifier code and the user 101 account identifier over the network 160. The user computing device 110 may compare the data from the merchant beacon identifier code to a database of merchant beacon identifier code data and merchant camera device identifier data to determine an identity of the merchant system and merchant POS device 130 associated with the merchant beacon identifier code and/or to verify the authenticity of the beacon. In this example embodiment, the account management system 160 extracts a facial template associated with the user 101 account identifier. In an example embodiment, the account management system 150 accesses a database comprising stored facial templates of a plurality of users 101 with corresponding user 101 account identifiers for each user 101 to identify the facial template associate with the user 101 account identifier. For example, this database is stored in the data storage unit 156.

In an example embodiment, the account management system 150 identifies a merchant POS device 130 associated with the merchant beacon device 120 identifier. In an example embodiment, the account management system 150 recognizes that the merchant beacon identifier code is associated with the account management system 150 and a particular merchant POS device 130 at the merchant system location. In an example embodiment, the account management system 150 transmits the facial template of the identified user 101 to the identified merchant POS device 130 associated with the merchant beacon device 120 identifier. In this example embodiment, the merchant POS device 130 receives the facial template of the user 101. In an example, the one or more additional facial templates are received in real time from the account management system 150 as additional merchant beacon device 120 identifiers are retransmitted by user computing devices 110 at the merchant system location to the account management system 150. In these example embodiments, the merchant POS device 130 adds the facial template of the user 101 to a current customer log.

In certain example embodiments, a service provider system determines and/or verifies the identity of the user 101 for ends other than conducting a transaction via the application 113 and account management system 150. For example, reliable user 101 identification and/or verification from a candidate set of users 101 via facial identification may be useful for purposes of authentication, granting access, or personalizing experiences with the service provider system online and/or at a location associated with the service provider system.

In an example embodiment, gaining access to a service provider system location or authorization to purchase a product or service of the service provider system is restricted to a certain type of user 101 based on user 101 attributes or based on the identity of the user 101. An example user attribute is the age of the user 101. In this example embodiment, the account management system 150 sends encrypted identification information associated with a user 101 to a computing device at a service provider location after anticipating that the user 101 may visit the location in the future. The account management system 150 may also transmit a cryptographic key to the user computing device 110 associated with the user 101 able to decrypt the encrypted identification information. At a later time, the user 101 signs into an application 113 associated with the account management system 150 via the user computing device 110 and enters the service provider system location. The user computing device 110 may transmit the cryptographic key to the service provider computing device. The service provider computing device receives the cryptographic key and decrypts the identification information associated with the user 101. The service provider computing device captures a facial image of the user and identifies the user 101 by comparing the captured facial image against facial templates received from the account management system 150 to find a match. In this example embodiment, the user 101 requests to access a restricted area, such as an area behind a gate, an office, or a room storing archives.

In this example embodiment, based on the generated facial template matching a particular facial template associated with the user 101 account received from the account management system 150, the service provider system computing device or service provider system computing device operator approves or denies access to a restricted area or restricted data by the user 101 based on the user 101 identity and/or user 101 account information. In yet another example embodiment, a merchant system or service provider system may identify a user 101 to provide delivery to a user 101. In this example embodiment, the user 101 requests to pickup and item that was previously ordered. In this example, based on the identity of the user 101 matching a user 101 identity associated with an item for pickup, the operator of the merchant POS device 130 or other merchant system employee delivers the item to the user 101. For example, the merchant POS device 130 operator determines the item for pickup associated with the identified user 101.

Other Example Embodiments

FIG. 10 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify users, comprising:
    predicting, by an account management computing device, that one or more users will arrive at a merchant location;
    communicating, by the account management computing device to a merchant point of sale device at the merchant location and in response to predicting that the one or more users will arrive at the merchant location, encrypted identification information associated with the one or more users;
    generating, by the account management computing device, a respective cryptographic key for each of the one or more users;
    communicating, by the account management computing device to a respective user computing device of each of the one or more users, the respective cryptographic key;

at a time after receiving the encrypted identification information, receiving, by the merchant point of sale device and from the respective user computing device of a first user of the one or more users that has entered the merchant location, the respective cryptographic key for the first user;

decrypting, by the merchant point of sale device at the merchant location, using the respective cryptographic key for the first user, the previously received encrypted identification information to access unencrypted identification information for the first user;

verifying, by the merchant point of sale device at the merchant location, using the unencrypted identification information for the first user, an identity of the first user; and processing by the merchant point of sale device at the merchant location, a request in response to verifying the identity of the first user.

2. The method of claim 1, further comprising:

detecting, by the respective user computing device of the first user, that the respective user computing device of the first user entered the merchant location; and in response to detecting, by the respective user computing device of the first user, that the respective user computing device of the first user entered the merchant location, communicating, by the respective user computing device of the first user, the respective cryptographic key for the first user to the merchant point of sale device.

3. The method of claim 1, further comprising, by the merchant point of sale device:

receiving, at a time before receiving the respective cryptographic key for the first user from the respective user computing device of the first user, the encrypted identification information associated with the one or more users, including the encrypted identification information associated with the first user; and storing the received encrypted identification information.

4. The method of claim 1, wherein the encrypted identification information comprises a facial template of the first user, and wherein verifying, using the unencrypted identification information, the identity of the first user comprises:

capturing, by a camera associated with the merchant point of sale device, a video feed of an environment external to the computing device;

extracting a facial image of the first user from the video feed;

generating a facial template based on the extracted facial image, the facial template comprising a representation of the extracted facial image;

retrieving one or more stored facial templates associated with the one or more users predicted to arrive at the location;

determining a similarity between the generated facial template and each of the one or more stored facial templates; and identifying a particular stored facial template that corresponds to the generated facial template based on a determination that the similarity between the generated facial template and the stored facial template exceeds a similarly threshold.

5. The method of claim 1, wherein processing the request comprises granting access to a secure location.

6. The method of claim 1, wherein processing the request comprises granting, to the respective user computing device of the first user, access to data.

7. The method of claim 1, further comprising, by the merchant point of sale device:

receiving payment account information at a time after receiving the respective cryptographic key from the respective user computing device of the first user, wherein the request comprises a request to process a transaction, and wherein processing the request comprises processing, by the merchant point of sale device, the requested transaction by communicating with a computing device of an issuer system associated with the payment account information.

8. The method of claim 1, wherein the merchant point of sale device receives the encrypted identification information associated with the one or more users based on a determination that a likelihood of the one or more users visiting the merchant location is greater than a threshold likelihood.

9. A computer program product to identify users, comprising:

a non-transitory computer-readable medium having computer-readable program instructions embodied thereon that when executed by a computer cause the computer to:

receive, from an account management computing device in response to the account management computing device predicting that one or more users will arrive at a merchant location of the computer, encrypted identification information associated with one or more user accounts of the one or more users, each user account comprising a facial template of a respective user of such user account, the facial template comprising a representation of a facial image of the respective user;

at a time after receiving the encrypted identification information, receive, from a user computing device that has entered the merchant location, a cryptographic key, the user computing device being associated with a first user of the one or more users, and the cryptographic key being received by the user computing device from the account management computing device;

decrypt, using the cryptographic key, the encrypted identification information to access unencrypted identification information;

capture, by a camera device, a video feed of an environment external to the computer;

extract a facial image of the first user from the video feed;

generate a facial template based on the facial image of the first user, the facial template comprising a representation of the facial image of the first user;

retrieve one or more stored facial templates associated with the one or more users predicted to arrive at the location associated with the computer;

determine a similarity between the generated facial template of the facial image of the first user and each of the one or more stored facial templates;

identify a particular stored facial template that corresponds to the generated facial template based on a determination that the similarity between the generated facial template and the stored facial template exceeds a similarly threshold; and process a service request for the user account of the first user associated with the identified particular stored facial template in response to identifying the particular stored facial template.

10. The computer program product of claim 9, wherein processing the service request comprises granting access to a secure location.

11. The computer program product of claim 9, wherein the user computing device detects that the user computing device entered the location associated with the computer, and the user computing device communicates the cryptographic key to the computer in response to detecting that the user computing device entered the location associated with the computer.

12. The computer program product of claim 9, wherein the non-transitory computer-readable medium further comprises computer-readable program instructions embodied thereon that when executed by the computer cause the computer to:
receive payment account information from the account management computing device at a time before receiving the cryptographic key from the user computing device, wherein the service request comprises a request to process a transaction and wherein processing the service request comprises processing the requested transaction by communicating with a computing device of an issuer system associated with the payment account information.

13. The computer program product of claim 9, wherein the account management computing device transmits the encrypted identification information associated with the one or more user accounts based on a determination that the likelihood of the one or more users visiting the merchant location is greater than a threshold likelihood.

14. A system to identify users, comprising:
a storage device; and
a processor communicatively coupled to the storage device, wherein the processor executes application code instructions that are stored in the storage device to cause the system to:
receive, from an account management computing device in response to the account management computing device predicting that one or more users will arrive at a merchant location of a merchant point of sale device, encrypted identification information associated with one or more user accounts of the one or more users, each user account comprising a facial template of a respective user of such user account, the facial template comprising a representation of a facial image of the respective user;
at a time after receiving the encrypted identification information, receive, from a user computing device that has entered the merchant location, a cryptographic key, the cryptographic key having been received by the user computing device from the account management computing device, the user computing device being associated with a first user of the one or more users;
decrypt, using the cryptographic key, the encrypted identification information to access the identification information;
capture, by a camera device, a video feed of an environment external to the system;
extract a facial image of the first user from the video feed;
generate a facial template based on the facial image of the first user, the facial template comprising a representation of the facial image of the first user;
retrieve one or more stored facial templates associated with the one or more users predicted to arrive at the location associated with the computer;
determine a similarity between the generated facial template of the facial image of the first user and each of the one or more stored facial templates;
identify a particular stored facial template that corresponds to the generated facial template based on a determination that the similarity between the generated facial template and the stored facial template exceeds a similarly threshold; and
process a service request for the user account of the first user associated with the identified particular stored facial template in response to identifying the particular stored facial template.

15. The system of claim 14, wherein processing the service request comprises granting access to a secure location or granting the user computing device access to data.

16. The system of claim 14, wherein the user computing device executes instructions to:
detect, by the user computing device, that the user computing device entered the merchant location; and
in response to detecting, by the user computing device, that the user computing device entered the merchant location, communicate, by the user computing device, the cryptographic key to the system.

* * * * *